(12) United States Patent
Fujita

(10) Patent No.: US 8,526,501 B2
(45) Date of Patent: Sep. 3, 2013

(54) DECODER AND DECODING METHOD BASED ON VIDEO AND AUDIO TIME INFORMATION

(75) Inventor: Shin Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 12/656,509

(22) Filed: Feb. 1, 2010

(65) Prior Publication Data

US 2010/0142624 A1    Jun. 10, 2010

Related U.S. Application Data

(63) Continuation of application No. PCT/JP2007/066557, filed on Aug. 27, 2007.

(51) Int. Cl.
*H04N 7/12* (2006.01)

(52) U.S. Cl.
USPC ....................................... 375/240.16

(58) Field of Classification Search
USPC ........................................ 375/240.01, 240.1
IPC ....................................... H04N 7/12
See application file for complete search history.

(56) References Cited

U.S. PATENT DOCUMENTS

| | | | | |
|---|---|---|---|---|
| 6,018,376 A | * | 1/2000 | Nakatani | 375/240.28 |
| 6,148,135 A | * | 11/2000 | Suzuki | 386/201 |
| 2004/0022525 A1 | | 2/2004 | Yamashita | |
| 2006/0123458 A1 | | 6/2006 | Katayama et al. | |
| 2007/0005690 A1 | * | 1/2007 | Corley et al. | 709/203 |

FOREIGN PATENT DOCUMENTS

| | | |
|---|---|---|
| JP | 07-170490 | 7/1995 |
| JP | 09-065303 | 3/1997 |
| JP | 2000-115772 | 4/2000 |
| JP | 2002-176643 | 6/2002 |
| JP | 2003-309781 | 10/2003 |
| JP | 2004-357267 | 12/2004 |
| JP | 2006-148335 | 6/2006 |

OTHER PUBLICATIONS

Patent Abstracts of Japan, Publication No. 09-065303, Published Mar. 7, 1997.
Patent Abstracts of Japan, Publication No. 2002-176643, Published Jun. 21, 2002.
Patent Abstracts of Japan, Publication No. 2006-148335, Published Jun. 8, 2006.
Patent Abstracts of Japan, Publication No. 07-170490, Published Jul. 4, 1995.

(Continued)

*Primary Examiner* — David Czekaj
*Assistant Examiner* — Tracy Li
(74) *Attorney, Agent, or Firm* — Staas & Halsey LLP

(57) ABSTRACT

A decoder is disclosed. A video decoder extracts, when receiving a video stream, video output time information attached to each video frame. Thereafter, a difference value calculator calculates a difference value between an occurrence time of a synchronizing signal and the video output time information. Further, an audio output time corrector corrects, using the difference value, audio output time information attached to each audio frame. Then, a video source outputs video represented by a video frame in synchronization with a synchronizing signal. An audio source outputs, when a value of reference time information and a corrected value of the audio output time information are synchronized, audio represented by an audio frame with the synchronized audio output time information.

6 Claims, 13 Drawing Sheets

(56) References Cited

OTHER PUBLICATIONS

Figure 1:
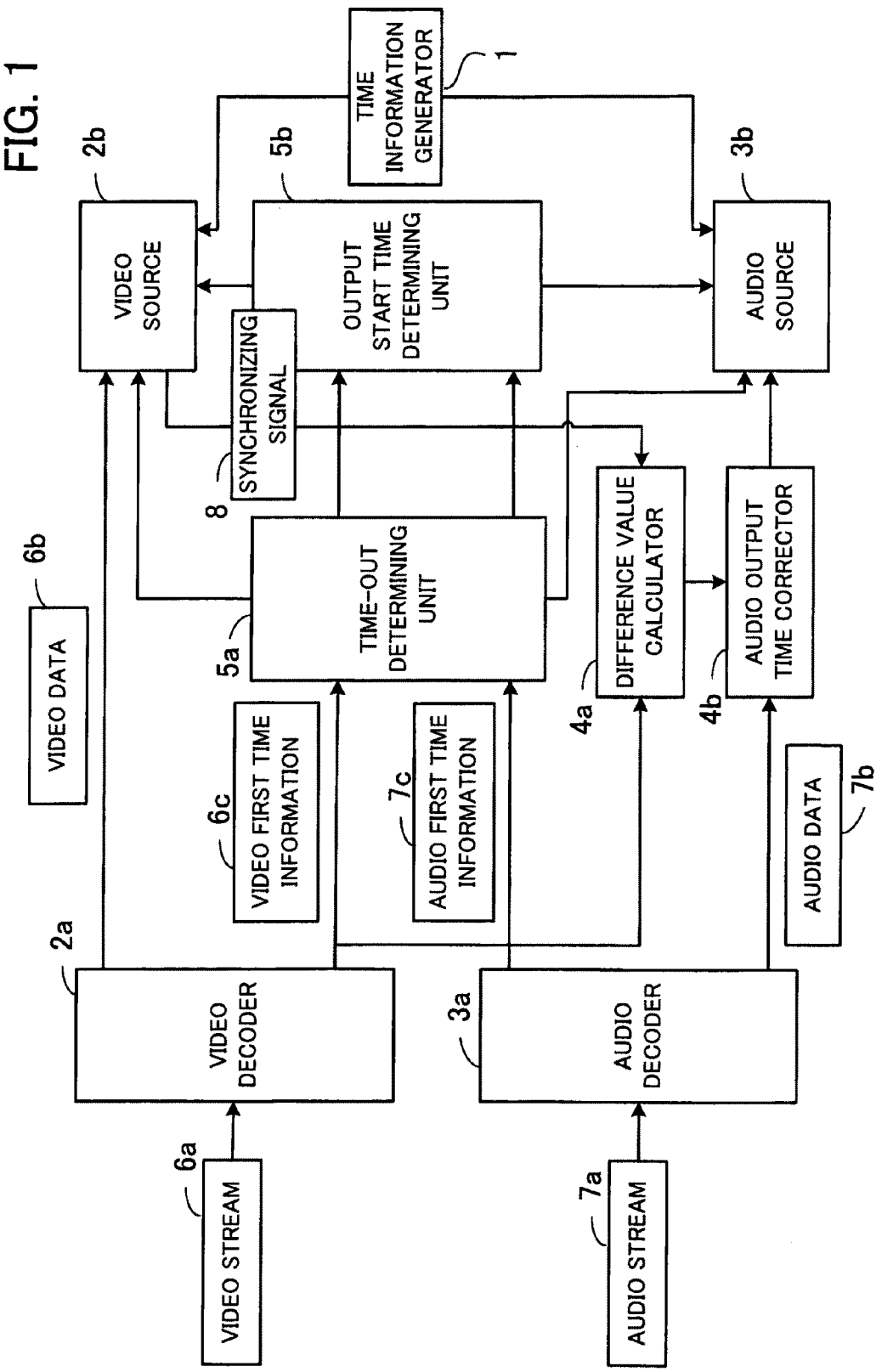

Patent Abstracts of Japan, Publication No. 2004-357267, Published Dec. 16, 2004.
Prior Art Information List (1 page).
Japanese Patent Abstracts, Publication No. 2000-115772, published Apr. 21, 2000.
Japanese Patent Abstracts, Publication No. 2003-309781, published Oct. 31, 2003.
Japanese Patent Office Action dated Dec. 27, 2011 for Japanese Application No. 2009-529588.

* cited by examiner

DECODER AND DECODING METHOD BASED ON VIDEO AND AUDIO TIME INFORMATION

This application is a continuing application, filed under 35 U.S.C. §111(a), of International Application PCT/JP2007/066557, filed Aug. 27, 2007.

FIELD

The embodiments discussed herein are related to a decoder and decoding method for stream data.

BACKGROUND

Recently, techniques for processing video and audio digital signals have remarkably advanced. With the advancement of the techniques, a system development toward the realization of digital broadcasting and the realization of the integration of broadcasting and communication has been advanced around the world.

Services in a technical field where the integration of broadcasting and communication has progressed include information delivery services by data streaming. These delivery services by the stream delivery method especially tend to increase. The streaming delivery method generally reproduces incoming data in real time. Examples of a system using this method include video on demand (VOD) and live video streaming delivery or a teleconferencing system.

Also, video delivery services on wide area and various networks represented by the internet have rapidly developed. These video delivery services are mostly streaming delivery services using a compression technique such as MPFG (Moving Picture Experts Group) and H.264.

In a real-time system, video/audio outputs are reproduced as follows. A decoder extracts a system reference time (PCR: Program Clock Reference or SCR: System Clock Reference) from a system stream, and reproduces an STC (System Time Clock) using the extracted value. Then, the decoder compares the STC with a PTS (Presentation Time Stamp) of each of a video stream and an audio stream, and reproduces video data and audio data. This processing enables real-time output in which video output and audio output are synchronized.

In addition, a conventional technique attaches time codes to audio data and video data, and causes a receiver to synchronize audio output with video output using the time codes (see, e.g., Japanese Laid-open Patent publication No. 09-65303).

The video output needs to be synchronized with a vertical synchronizing signal (VSYNC). Meanwhile, the audio output can be immediately reproduced in synchronization with the STC. Accordingly, the video output is kept waiting until the next VSYNC occurs after the STC reaches a time indicated by the PTS. As a result, the video output is more delayed than the audio output. At this time, some functions for absorbing differences between a video output timing (occurrence time of the VSYNC) and an audio output timing needs to be added to synchronously start the video and audio outputs. For example, a function of holding the PTS extracted from a video stream and causing the VSYNC to load the held signal into a counter of a system clock on a receiving side needs to be added. This function keeps also the audio output waiting while holding the PTS extracted from the video stream. As a result, the video output and the audio output can be precisely synchronized (see, e.g., Japanese Laid-open Patent publication No. 2002-176643).

However, real-time transmission assumes that a value of the STC is determined based on the PCR or the SCR. This assumption makes it impossible to set an arbitrary value to the STC in a decoder. That is, this assumption makes it impossible to realize the real-time transmission capable of loading the held value of the PTS into the STC at an arbitrary timing for the purpose of synchronously outputting video and audio as described in Japanese Laid-open Patent publication No. 2002-176643. Accordingly, a conventional technique is unable to realize the real-time transmission capable of absorbing an output error due to a waiting time that occurs until the next VSYNC occurs.

Further, a conventional method for synchronously outputting video and audio assumes only a case where the video and audio PTSs of first frames of the video and audio outputs are synchronized. Therefore, this conventional method is not applicable to a case where the PTSs are not synchronized. That is, input timings of video data and audio data to an encoder may fail to synchronize (the PTS values attached to video data and audio data at the start of input operations differ from each other). In this case, the conventional technique performs the following processing. A video stream and an audio stream are supplied to a decoder at each timing. Then, a video source and an audio source compare a first PTS of each of the video stream and the audio stream with the STC, and determine video and audio output start timings, respectively. Therefore, when the first PTS values of the video stream and the audio stream differ from each other, a receiving side fails to synchronize the video and audio output start timings.

Further, it is considered that the decoder receives only a video stream or an audio stream. In this case, measures to distinguish these cases are indispensable.

SUMMARY

According to one aspect of the present invention, there is provided a decoder for outputting video and audio based on stream data. This decoder includes: a time information generator which generates reference time information whose value increases with time; a video decoder which decodes, when receiving a video stream, the incoming video stream to generate video data, the video stream being obtained by encoding video data and being attached with video output time information indicating an output time of video per video frame, and which extracts the video output time information attached to each video frame; an audio decoder which decodes, when receiving an audio stream, the incoming audio stream to generate audio data, the audio stream being obtained by encoding audio data and being attached with audio output time information indicating an output time of audio per audio frame, and which extracts the audio output time information attached to each audio frame; a difference value calculator which calculates a difference value between an occurrence time of a synchronizing signal indicating an output timing of video and the video output time information; an audio output time corrector which corrects, using the difference value calculated by the difference value calculator, the audio output time information attached to each audio frame; a video source which outputs video upon each occurrence of a synchronizing signal based on a previously defined relationship between a value of the reference time information upon occurrence of the synchronizing signal and a range of the video output time information that can be displayed upon the occurrence of the synchronizing signal, the video being represented by a video frame attached with the video output time information that can be displayed based on a value of the reference time information upon the occurrence of the synchronizing signal; and an audio source which outputs audio when a value of the reference time information and a corrected value of the audio output time information are synchronized, the audio being represented by an audio frame with the synchronized audio output time information.

The object and advantages of the invention will be realized and attained by unit of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

Figure 2:
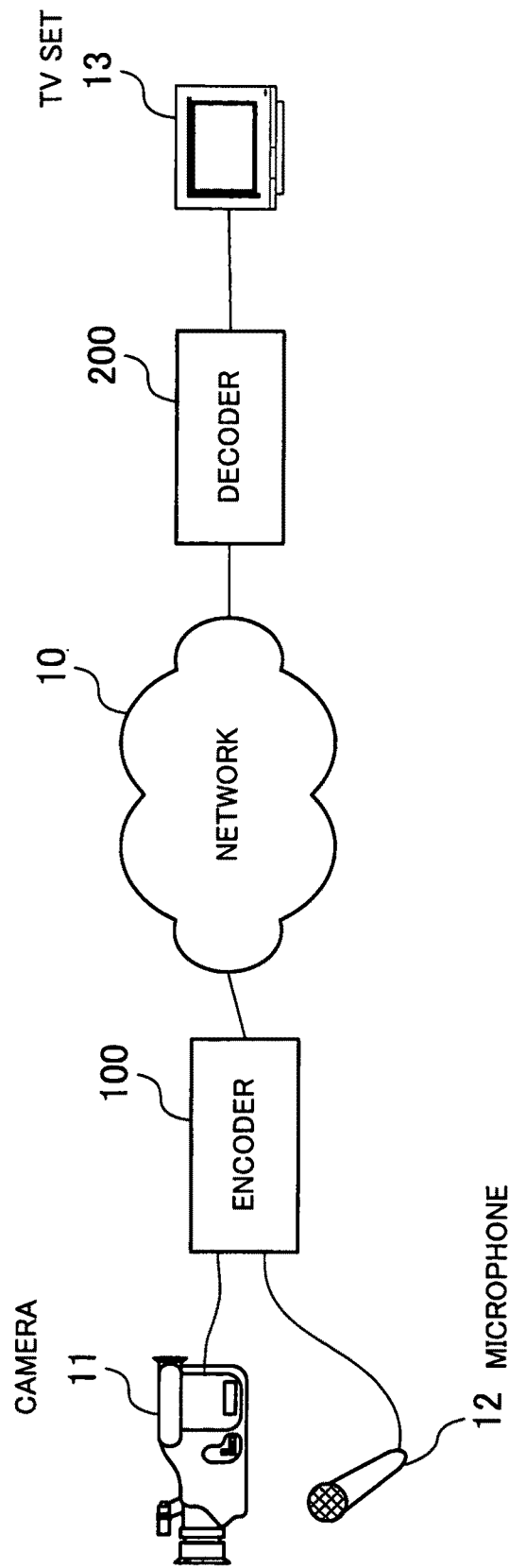
Figure 3:
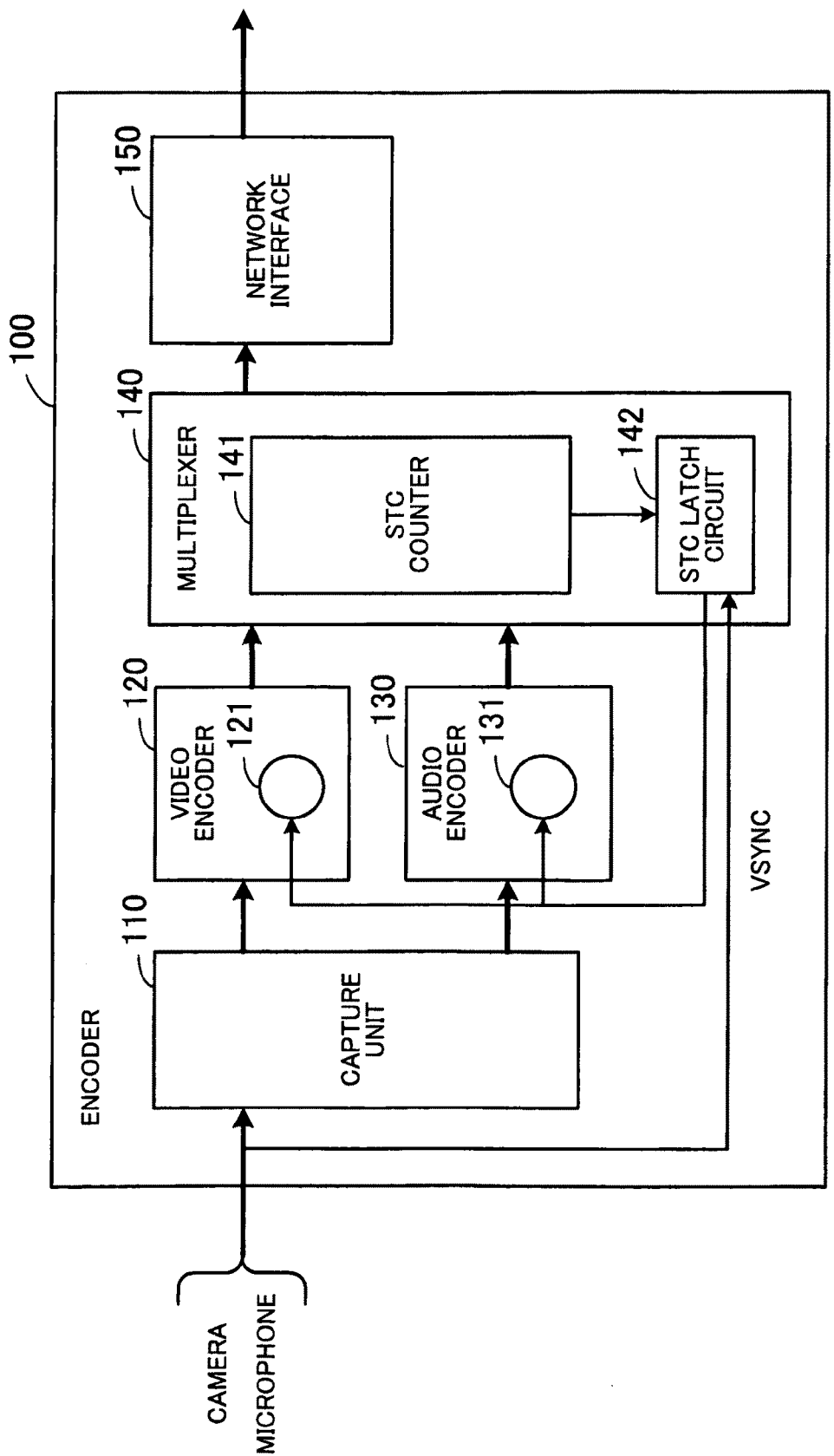
Figure 4:
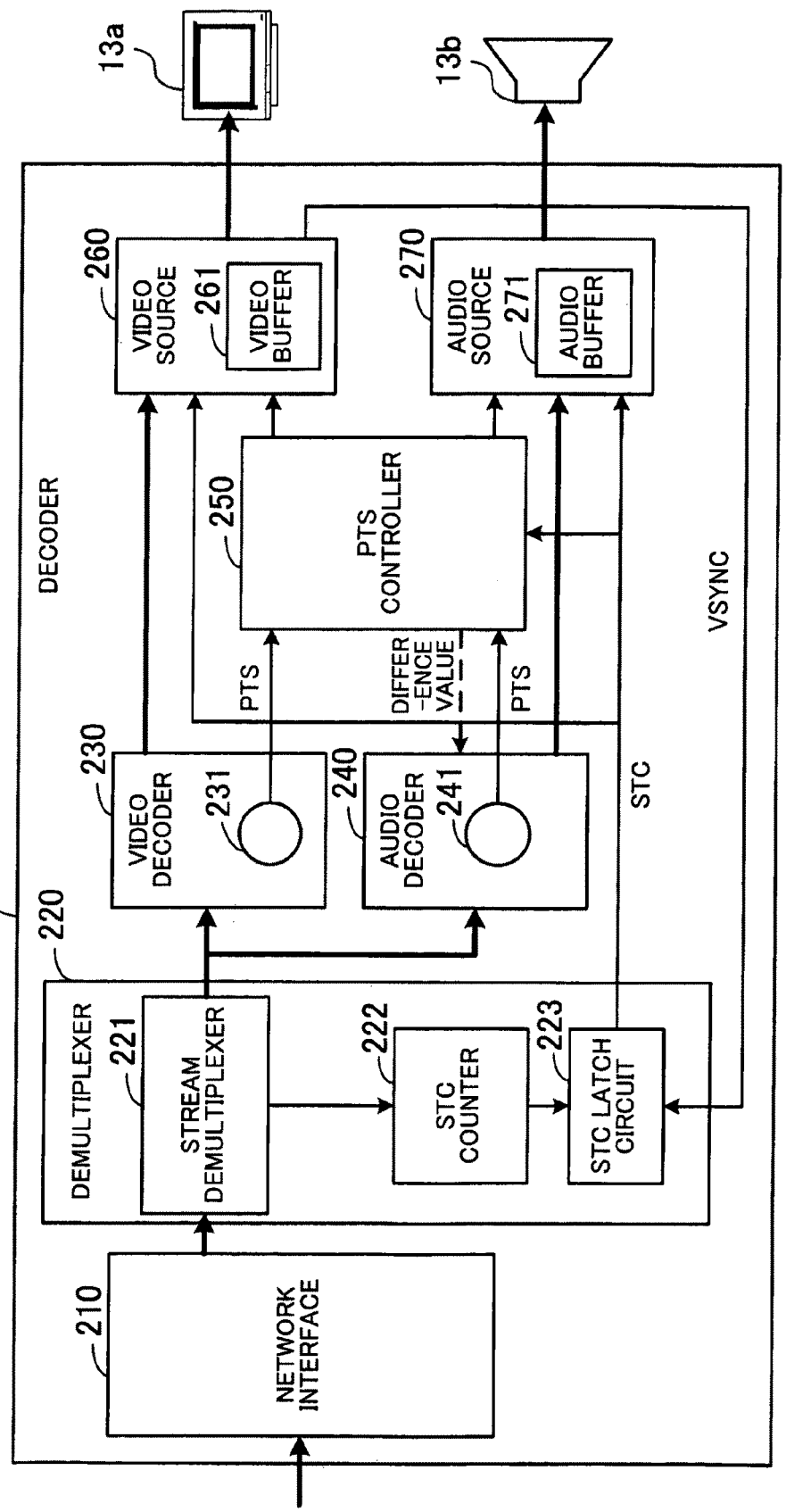
Figure 5:
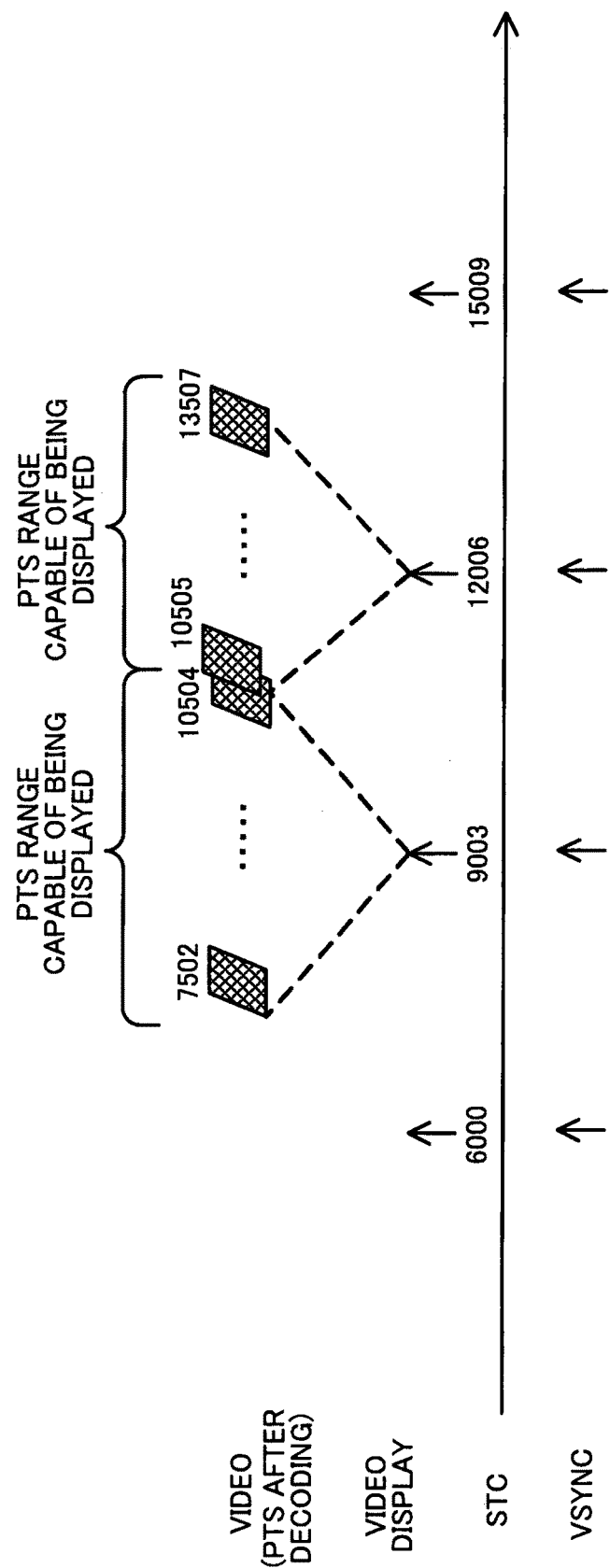
Figure 6:
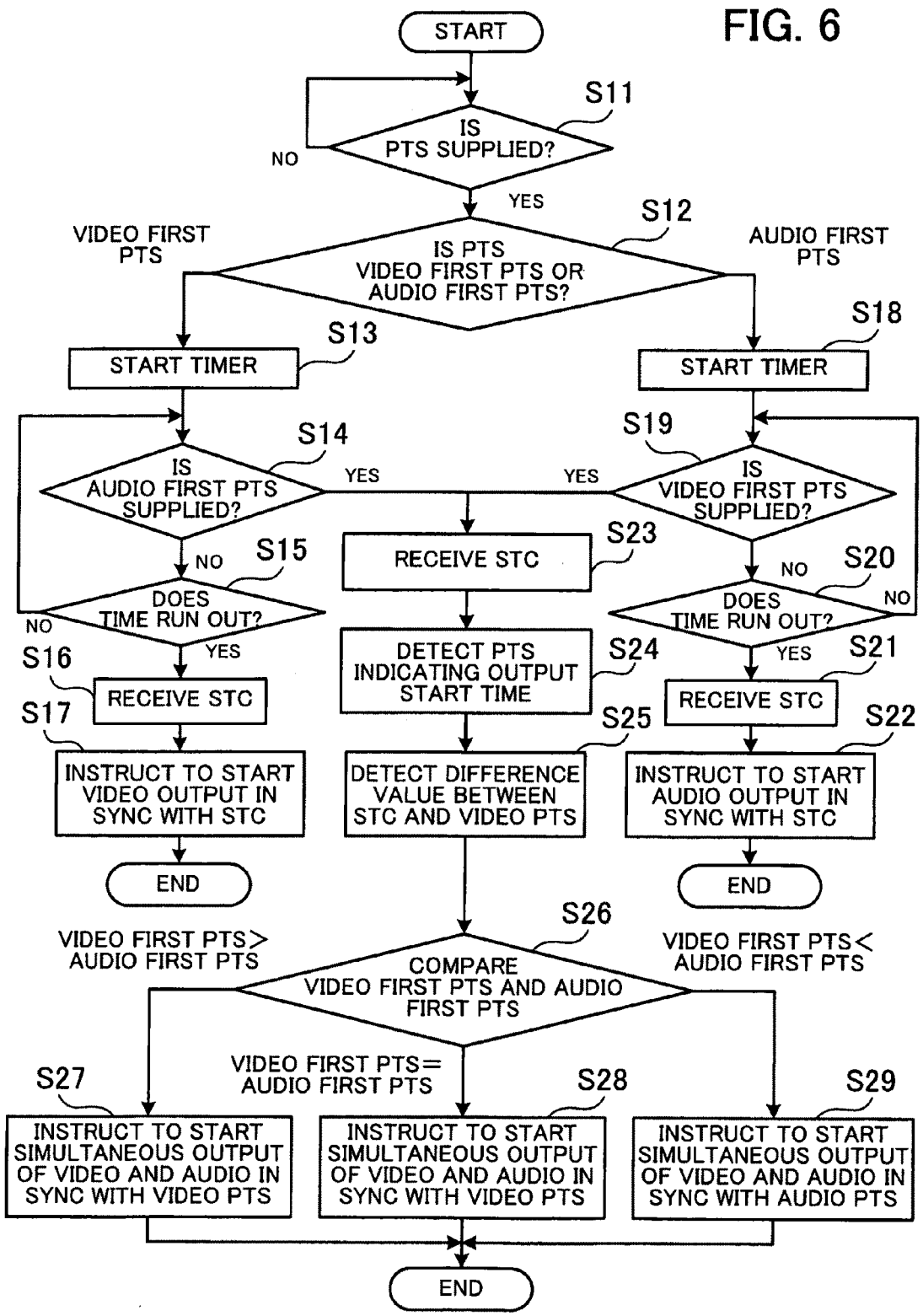
Figure 7:
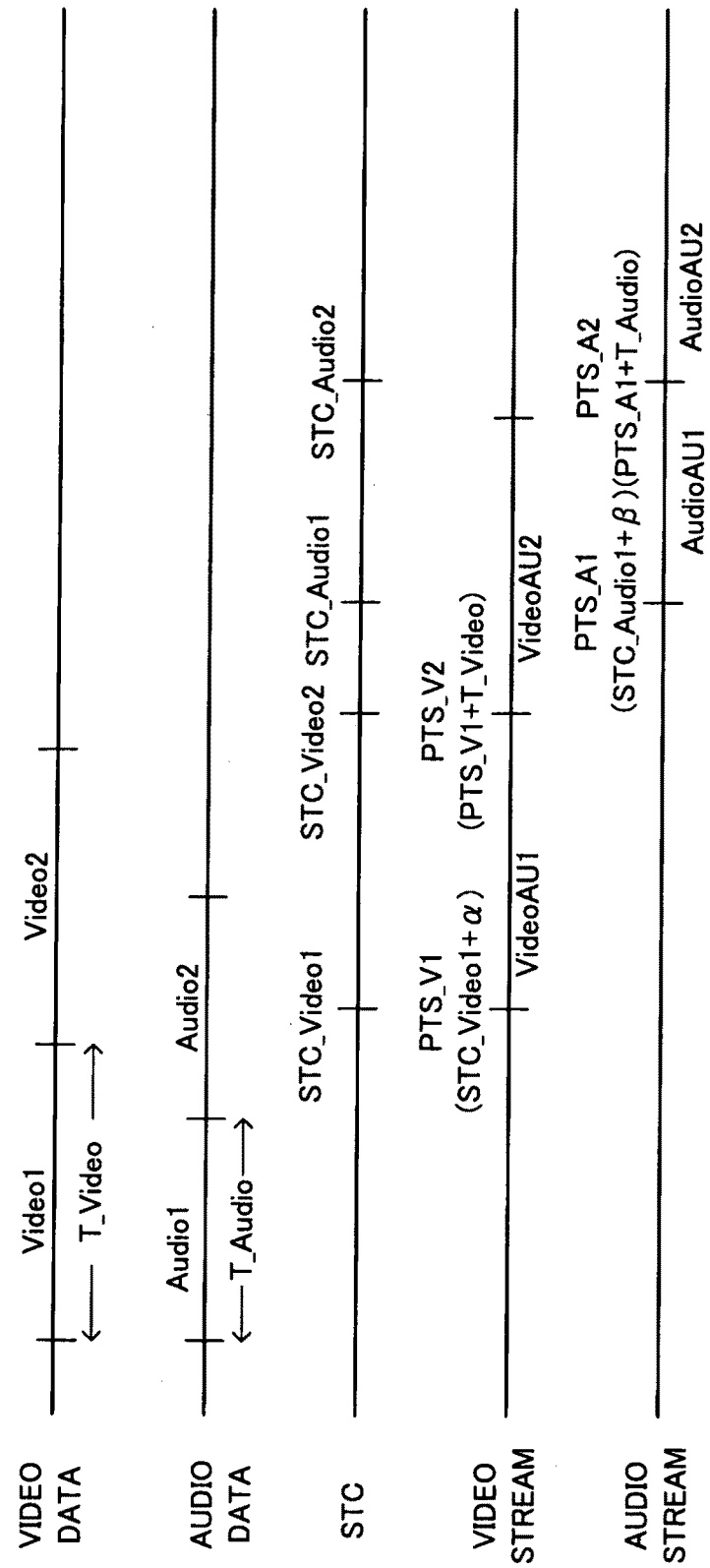
Figure 8:
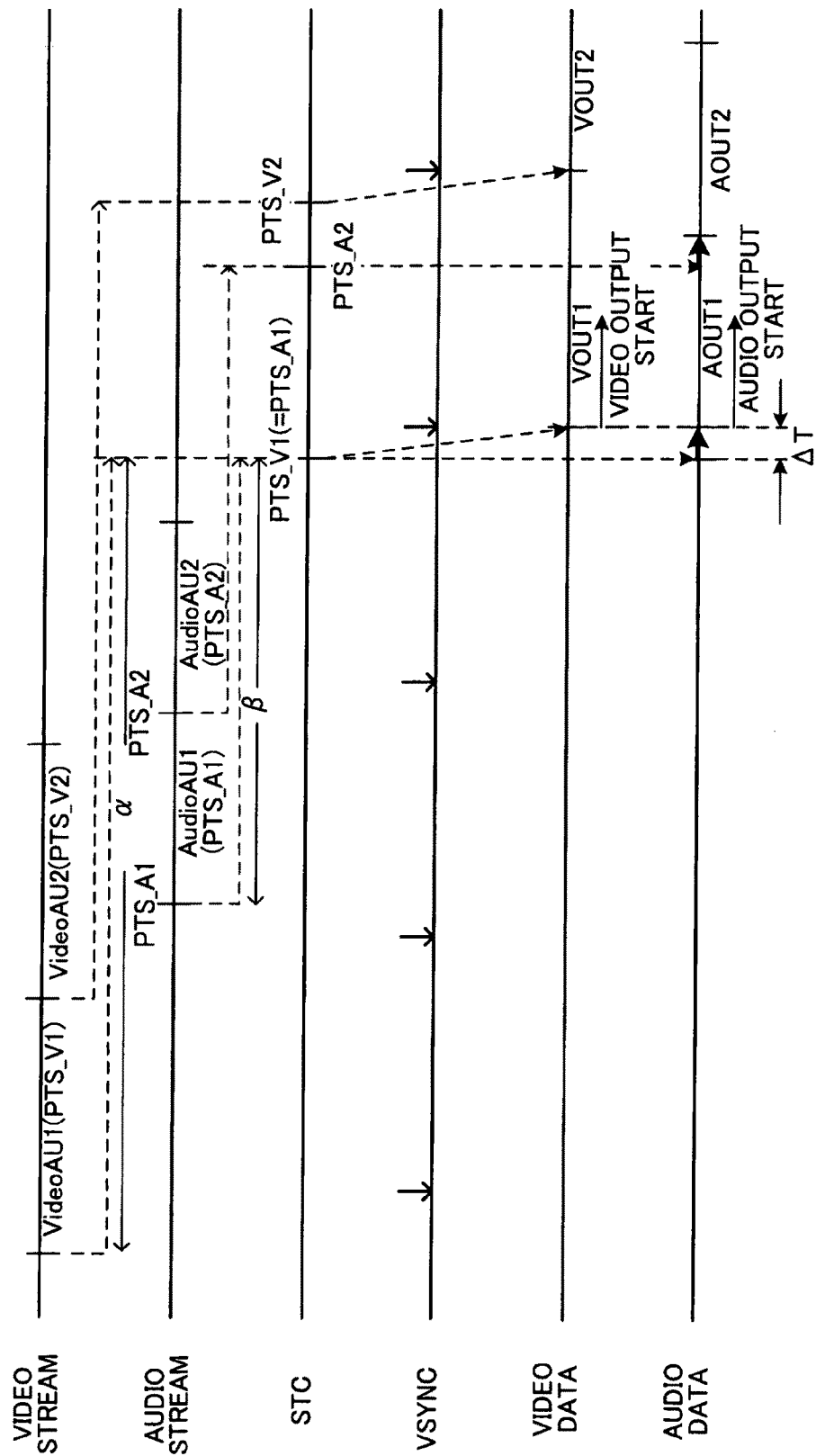
Figure 9:
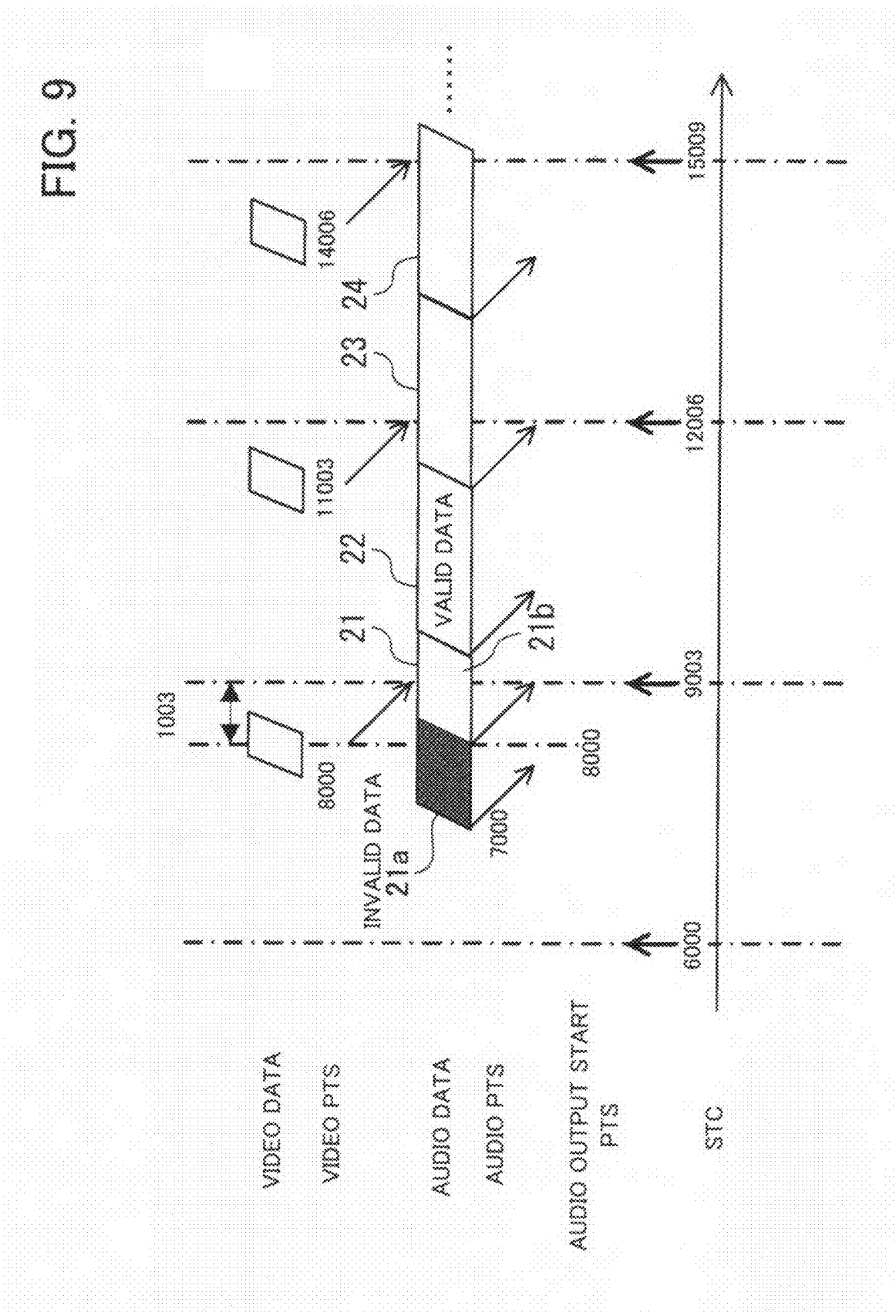
Figure 10:
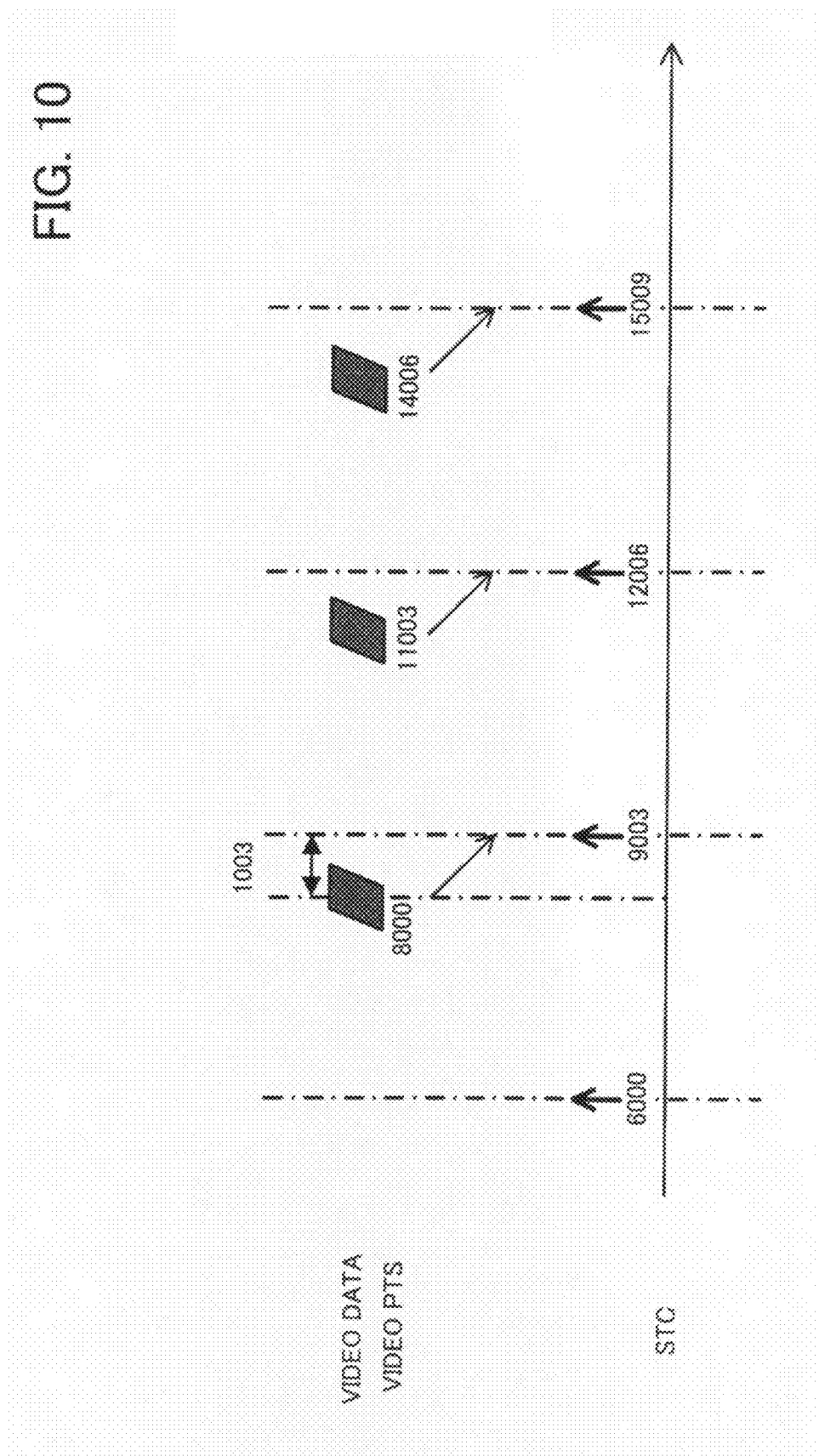
Figure 11:
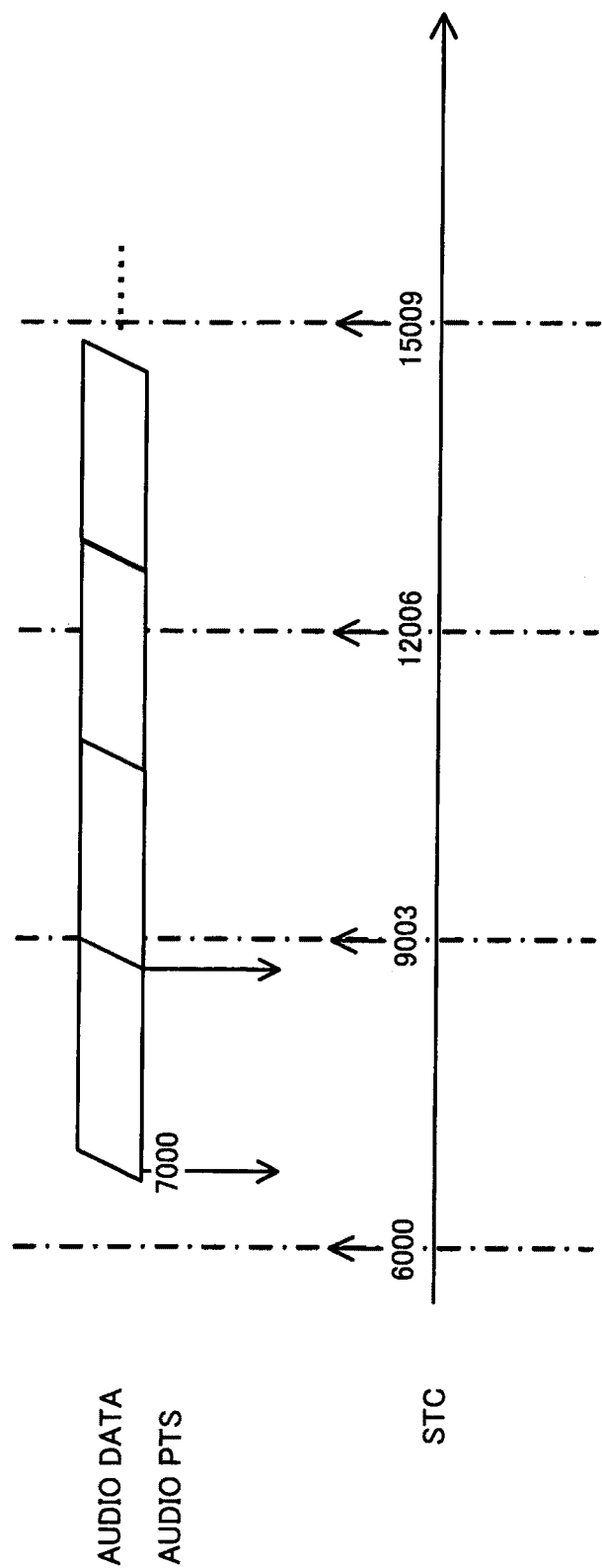
Figure 12:
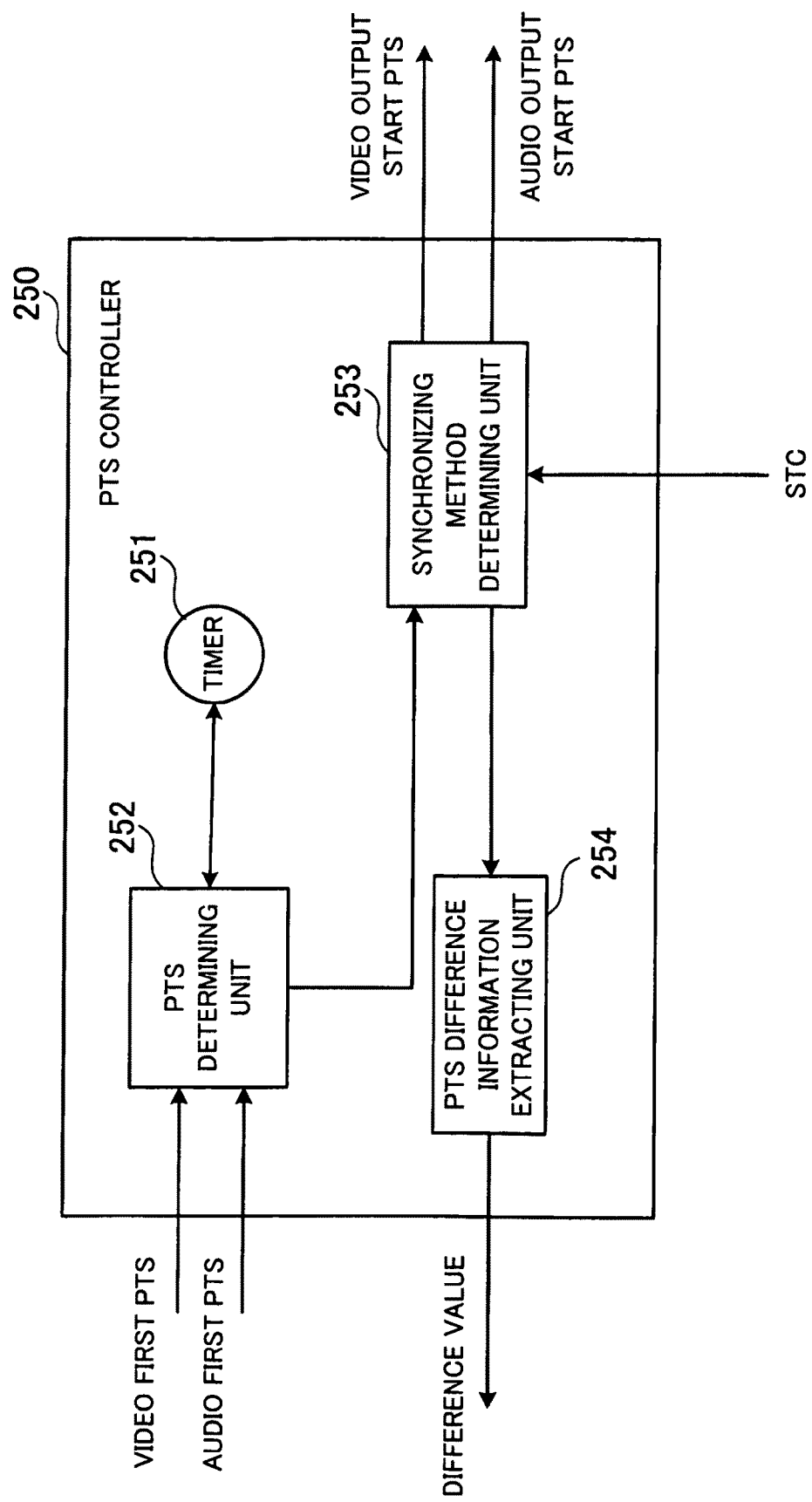
Figure 13:
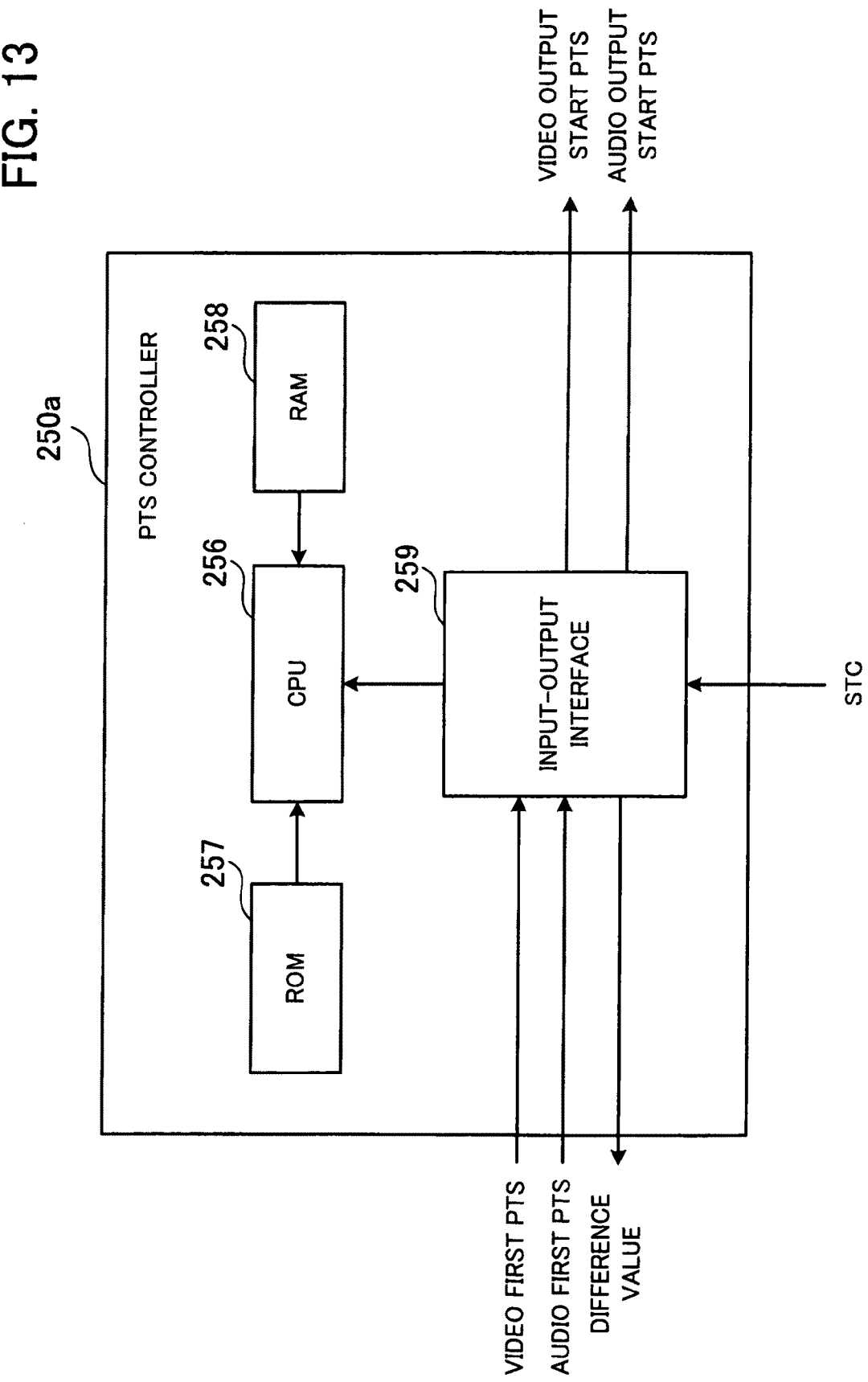

FIG. 1 illustrates an overview of an embodiment;
FIG. 2 illustrates a system configuration example according to an embodiment;
FIG. 3 is a block diagram illustrating an internal structure of an encoder;
FIG. 4 is a block diagram illustrating an internal structure of a decoder;
FIG. 5 illustrates an effective area of a display frame in a video output;
FIG. 6 is a flowchart illustrating processing procedures of a PTS controller;
FIG. 7 is a timing chart illustrating encoding processing by the encoder;
FIG. 8 is a timing chart illustrating decoding processing by the decoder;
FIG. 9 is a timing chart illustrating an output timing in a case where audio capture is started earlier than video capture;
FIG. 10 illustrates an output example when only a video stream is supplied;
FIG. 11 illustrates an output example when only an audio stream is supplied;
FIG. 12 is a block diagram illustrating an internal structure of the PTS controller; and
FIG. 13 illustrates an example of the PTS controller realized by a microcomputer.

DESCRIPTION OF EMBODIMENT(S)

Preferred embodiments of the present invention will be described below with reference to the accompanying drawings, wherein like reference numerals refer to like elements throughout.

FIG. 1 illustrates an overview of an embodiment. A decoder according to the embodiment includes a time information generator 1, a video decoder 2a, an audio decoder 3a, a difference value calculator 4a, an audio output time corrector 4b, a time-out determining unit 5a, an output start time determining unit 5b, a video source 2b, and an audio source 3b.

The time information generator 1 generates reference time information whose value increases with time. For example, the time information generator 1 generates reference time information (e.g., STC) based on a clock reference transmitted, from an encoder which encodes a video stream 6a and an audio stream 7a, with the encoded video stream 6a and audio stream 7a.

The video decoder 2a receives the video stream 6a. The video stream 6a is a stream obtained by encoding video data. The video stream 6a is attached with video output time information (e.g., video PTS) indicating an output time of video per video frame. The video decoder 2a decodes, when receiving the video stream 6a, the incoming video stream 6a to generate video data 6b. Further, the video decoder 2a extracts the video output time information attached to each video frame. For example, the video decoder 2a extracts, as video first time information 6c, the video output time information attached to a first video frame of the video stream 6a.

The audio decoder 3a receives the audio stream 7a. The audio stream 7a is a stream obtained by encoding audio data. The audio stream 7a is attached with audio output time information (e.g., audio PTS) indicating an output time of audio per audio frame. The audio decoder 3a decodes, when receiving the audio stream 7a, the incoming audio stream 7a to generate audio data 7b. Further, the audio decoder 3a extracts, as audio first time information 7c, the audio output time information attached to a first audio frame of the audio stream 7a.

The difference value calculator 4a calculates a difference value between an occurrence time of a synchronizing signal 8 (e.g., a vertical synchronizing signal occurring at the output of video) indicating an output timing of video and the video output time information.

The audio output time corrector 4b corrects, using the difference value calculated by the difference value calculator 4a, the audio output time information attached to each audio frame.

The time-out determining unit 5a measures an elapsed time from the time when any one of the video first time information 6c and the audio first time information 7c is extracted. Then, the time-out determining unit 5a determines, when the elapsed time exceeds a predetermined threshold before the other information (unextracted information of the video first time information 6c and the audio first time information 7c) is extracted, that a time-out occurs. Then, the time-out determining unit 5a determines, when the time-out occurs, that only video data is output when only the video first time information 6c is extracted and that only audio data is output when only the audio first time information 7c is extracted.

The output start time determining unit 5b compares values of the video first time information 6c and the audio first time information 7c. As a result of comparison, when the value of the video first time information 6c is larger than that of the audio first time information 7c, the output start time determining unit 5b determines that a time indicated by the video first time information 6c is a video output start time and an audio output start time. Conversely, as a result of comparison, when the value of the audio first time information 7c is larger than that of the video first time information 6c, the output start time determining unit 5b determines that a time with the minimum value among the values of the video output time information larger than that of the audio first time information 7c is a video output start time and an audio output start time.

The video source 2b generates a synchronizing signal 8. The video source 2b outputs, upon each occurrence of a synchronizing signal 8, video (a video signal such as NTSC (National Television Standards Committee) represented by a video frame with the video output time information that can be displayed based on a value of the reference time information upon the occurrence of the synchronizing signal 8. A relationship between a value of the reference time information upon occurrence of the synchronizing signal 8 and a range of the video output time information that can be displayed upon the occurrence of the synchronizing signal 8 is previously defined. In addition, the video source 2b replaces, with invalid data, video generated from a video frame with video output time information having a value smaller than that of the video output start time determined by the output start time determining unit 5b. The video source 2b starts, when the time-out determining unit 5a determines that only video data is output, the output of video based on a video frame without waiting for determination of the video output start time by the output start time determining unit 5b.

The audio source 3b outputs, when a value of the reference time information and a corrected value of the audio output time information are synchronized, audio (e.g., analog audio signal) represented by the audio frame with the synchronized audio output time information. In addition, the audio source 3b replaces generated audio with invalid data before a time indicated by the reference time information reaches the audio output start time. In addition, the audio source 3b starts, when the time-out determining unit 5a determines that only audio data is output, the output of audio based on an audio frame without waiting for determination of the audio output start time by the output start time determining unit 5b.

According to the above-described decoder, the video decoder 2a decodes, when receiving the video stream 6a, the incoming video stream 6a to generate the video data 6b. Further, the video decoder 2a extracts the video output time information attached to each video frame (in the example of FIG. 1, the video first time information 6c is extracted as a representative). The audio decoder 3a decodes, when receiving the audio stream 7a, the incoming audio stream 7a to generate the audio data 7b. Further, the audio decoder 3a extracts the audio output time information attached to a first audio frame (in the example of FIG. 1, the audio first time information 7c is extracted as a representative) of the audio stream 7a.

Thereafter, the difference value calculator 4a calculates a difference value between an occurrence time of the synchronizing signal 8 and the video output time information. Further, the audio output time corrector 4b corrects, using the difference value, the audio output time information attached to each audio frame.

Here, the time-out determining unit 5a measures an elapsed time from the time when any one of the video first time information 6c and the audio first time information 7c is extracted. Then, the time-out determining unit 5a determines, when the elapsed time exceeds a predetermined threshold before the other information is extracted, that a time-out occurs.

When determining that the time-out occurs, the time-out determining unit 5a determines that only video data is output when only the video first time information 6c is extracted and that only audio data is output when only the audio first time information 7c is extracted. When the time-out determining unit 5a determines that only video data is output, the video source 2b starts the output of video based on a video frame without waiting for determination of the video output start time by the output start time determining unit 5b. When the time-out determining unit 5a determines that only audio data is output, the audio source 3b starts the output of audio based on an audio frame without waiting for determination of the audio output start time by the output start time determining unit 5b. When the time-out determining unit 5a determines that only audio data is output, the video decoder 2a fails to extract the video output time information and the difference value calculator 4a fails to calculate a difference value. Therefore, the audio source 3b determines an output time of an audio frame based on the audio output time information (uncorrected value) attached to the audio stream 7a.

When both of the video first time information 6c and the audio first time information 7c are extracted before the time-out occurs, the output start time determining unit 5b compares values of the video first time information 6c and the audio first time information 7c. As a result of comparison, when the value of the video first time information 6c is larger than that of the audio first time information 7c, the output start time determining unit 5b determines that a time indicated by the video first time information 6c is a video output start time and an audio output start time. Conversely, as a result of comparison, when the value of the audio first time information 7c is larger than that of the video first time information 6c, the output start time determining unit 5b determines that a time with the minimum value among the values of the video output time information larger than that of the audio first time information 7c is a video output start time and an audio output start time.

Then, the video source 2b outputs, upon each occurrence of a synchronizing signal 8, video represented by a video frame with the video output time information that can be displayed based on a value of the reference time information upon the occurrence of the synchronizing signal. On this occasion, the video source 2b replaces, with invalid data, video generated from a video frame with video output time information having a value smaller than that of the video output start time determined by the output start time determining unit 5b.

The audio source 3b outputs, when a value of the reference time information and a corrected value of the audio output time information are synchronized, audio represented by the audio frame with the synchronized audio output time information. On this occasion, the video source 3b replaces generated audio with invalid data before a time indicated by the reference time information reaches the audio output start time.

As described above, the proposed technique corrects the audio output time information by a difference value between an occurrence time of a synchronizing signal and the video output time information. As a result, the video output and the audio output can be precisely synchronized. That is, the proposed technique corrects the audio output time information of each audio frame by a time lag between an occurrence time of a synchronizing signal and a time indicated by the video output time information of each video frame. As a result, the video output and the audio output can be precisely synchronized. Moreover, the proposed technique directly uses the reference time information although the above-described technique (Japanese Laid-open Patent publication No. 2002-176643) changes the reference time information (e.g., STC) into an arbitrary value. Therefore, the embodiment provides a highly versatile technique applicable also to the real-time transmission.

The proposed technique compares the video first time information 6c and the audio first time information 7c, and sets the video output start time and the audio output start time to a later-received stream (a stream with information having a larger value of the video first time information 6c and the audio first time information 7c). Then, the proposed technique replaces, with invalid data, the video and audio before the video output start time (the same concept can also be applied to the audio output start time). As a result, even when capture start times of a video stream and an audio stream differ from each other, video output and audio output can be synchronously started at the time of reproduction and output of video data and audio data.

When only any one of the video first time information and the audio first time information is extracted and the other information is not extracted until the passage of a predetermined time, the proposed technique causes time-out to occur. When time-out occurs, the proposed technique outputs only a previously received stream. As a result, even when it is unknown whether both of a video stream and an audio stream are supplied or only any one of a video stream and an audio stream is supplied, the proposed decoder can make an appropriate judgment and perform the output.

Next, a more specific embodiment employing the MPEG standards will be described in detail.

FIG. 2 illustrates a system configuration example according to the embodiment. An encoder 100 and a decoder 200 are connected via a network 100. The encoder 100 is connected to a camera 11 and a microphone 12. The encoder 100 encodes video supplied from the camera 11 and audio supplied from the microphone 12 into digital data. The encoder 100 transmits the coded video and audio data by streaming to the decoder 200 via the network 10.

The decoder 200 is connected to a TV set 13. The decoder 200 reproduces the video and audio data transmitted by streaming from the encoder 100. The decoder 200 causes the TV set 13 to display the reproduced video. The decoder 200 causes a speaker of the TV set 13 to output the reproduced audio.

FIG. 3 is a block diagram illustrating an internal structure of the encoder 100. The encoder 100 has a capture unit 110, a video encoder 120, an audio encoder 130, a multiplexer 140, and a network interface 150.

The capture unit 110 receives video signals from the camera 11, and receives audio signals from the microphone 12. The capture unit 110 converts (captures) the incoming video signals and audio signals into digital data. Then, the capture unit 110 supplies video data generated from the video signals to the video encoder 120. The capture unit 110 stores the audio data generated from the audio signals in an internal memory by one audio frame (reproduction units provided by dividing audio data into blocks by a predetermined number of samples of audio signals). Then, the capture unit 110 supplies the audio data divided into data per audio frame to the audio encoder 130.

The video encoder 120 receives the video data from the capture unit 110. The video encoder 120 is connected to an STC latch circuit 142 within the multiplexer 140, and obtains a value of an STC from the STC latch circuit 142. The STC is a reference time for synchronously reproducing video and audio data.

The video encoder 120 has a PTS generator 121. The PTS generator 121 receives an STC. The PTS generator 121 generates output time information (PTS) from the received STC. Specifically, the PTS is a value obtained by adding an offset α to an STC counter value obtained during the capture. The offset α is a maximum value of a delay time caused by the encoding of the video data. A value of the offset α is previously set in an internal memory of the video encoder 120.

Then, the video encoder 120 executes compression coding of the video data by a compression coding method such as MPEG and H.264. Further, the video encoder 120 supplies the encoded video stream (ES: Elementary Stream) and PTS to the multiplexer 140.

The audio encoder 130 receives the audio data from the capture unit 110. The audio encoder 130 is connected to the STC latch circuit 142 within the multiplexer 140, and obtains a value of an STC from the STC latch circuit 142.

The audio encoder 130 has a PTS generator 131. The PTS generator 131 receives an STC. The PTS generator 131 generates a capture time (PTS) from the received STC. Specifically, the PTS is a value obtained by adding an offset β to an STC counter value obtained during the capture. The offset β is a maximum value of a delay time caused by the encoding of the audio data. A value of the offset β is previously set in an internal memory of the audio encoder 130.

Then, the audio encoder 130 executes compression coding of the audio data by a compression coding method such as MPEG-1 Layer II and Advanced Audio Coding (AAC). Further, the audio encoder 130 supplies the encoded audio stream (AES: Audio Elementary Stream) and PTS to the multiplexer 140.

The multiplexer 140 multiplexes the video stream and the audio stream. Specifically, the multiplexer 140 converts each stream of the video stream and the audio stream into a PES (Packetized Elementary Stream) stream. Further, the multiplexer 140 calculates a multiplexing start time. Then, the multiplexer 140 compares the multiplexing start time and a value of an STC counter 141. The multiplexer 140 converts the PES into a system stream immediately before the STC reaches the multiplexing start time, and outputs the system stream.

The multiplexer 140 has the STC counter 141 and the STC latch circuit 142. The STC counter 141 generates a reference time. The STC latch circuit 142 receives a vertical synchronizing (VSYNC) signal from the camera 11. The VSYNC signal is a signal for controlling a timing of switching screens. The STC latch circuit 142 latches (holds) a value of the STC counter 141 at an input timing of the VSYNC. The STC latch circuit 142 supplies the latched STC values to the video encoder 120 and the audio encoder 130.

The network interface 150 transmits, to the decoder 200 via the network 10, the system stream supplied from the multiplexer 140.

According to the above-described encoder 100, the capture unit 110 captures the incoming video signals from the camera 11. The capture unit 110 stores in an internal memory the video data per screen. Then, the capture unit 110 supplies the screen data to the video encoder 120.

Further, the capture unit 110 captures the incoming audio signals from the microphone 12. The capture unit 110 stores the audio data per audio frame in an internal memory. Then, the capture unit 110 supplies the audio data to the audio encoder 130.

The video encoder 120 obtains, when receiving screen data per video frame, a value (STC) of the STC latch circuit 142. Then, the PTS generator 121 adds the offset α to the STC value to generate a video PTS. Next, the video encoder 120 executes compression coding by a compression coding method such as MPEG and H.264 using, as input data, the screen data per video frame and the video PTS. The generated encoded video data (video stream) is streaming data composed of a plurality of packets. The video PTS is set in a header of a video packet. Then, the video encoder 120 supplies the encoded video data (video stream) to the multiplexer 140.

The audio encoder 130 obtains, when receiving audio data per audio frame, a value (STC) of the STC latch circuit 142. Then, the PTS generator 131 adds the offset β to the STC value to generate an audio PTS. Next, the audio encoder 130 executes compression coding by a compression coding method such as MPEG-1LayerII and Advanced Audio Coding (AAC) using, as input data, the audio data per audio frame and the audio PTS. The generated encoded audio data (audio stream) is streaming data composed of a plurality of packets. The audio PTS is set in a header of an audio packet. Then, the audio encoder 130 supplies the encoded audio data (audio stream) to the multiplexer 140.

The multiplexer 140 multiplexes each stream of the video stream and the audio stream, and converts them into a PES stream.

Further, the multiplexer 140 calculates a multiplexing start time (e.g., a value obtained by adding a value corresponding to the time necessary for conversion of a PES stream into a system stream to a current value of the STC counter 141 is used as the multiplexing start time). Then, the multiplexer 140 compares the multiplexing start time and a value of the STC counter 141. The multiplexer 140 converts the PES stream into the system stream immediately before a value of the STC counter 141 reaches the multiplexing start time, and outputs the system stream.

A header of the system stream contains a value of the STC counter 141 as a clock reference. When the system stream is an MPEG-PS (Program Stream), a system clock reference (SCR) is the clock reference. Meanwhile, when the system stream is an MPEG-TS (Transport Stream), a program clock reference (PCR) is the clock reference. The clock reference is information for setting the STC value used as a reference time of the decoder 200.

The system stream from the multiplexer 140 is transmitted to the decoder 200 via the network interface 150.

FIG. 4 is a block diagram illustrating an internal structure of the decoder 200. The decoder 200 has a network interface 210, a demultiplexer 220, a video decoder. 230, an audio decoder 240, a PTS controller 250, a video source 260, and an audio source 270.

The network interface 210 receives a system stream from the encoder 100 via the network 10. Then, the network interface 210 transfers the incoming system stream to the demultiplexer 220.

The demultiplexer 220 demultiplexes the system stream into a video stream and an audio stream. Specifically, the demultiplexer 220 has a stream demultiplexer 221. The stream demultiplexer 221 extracts a clock reference from a header of the system stream, and transfers the clock reference to the STC counter 222. Further, the stream demultiplexer 221 converts the system stream into a PES stream, and then classifies packets included in the PES stream into a video packet and an audio packet. Further, the stream demultiplexer 221 generates a video stream from the video packet, and generates an audio stream from the audio packet. Then, the stream demultiplexer 221 supplies the video stream to the video decoder 230, and supplies the audio stream to the audio decoder 240.

The STC counter 222 within the demultiplexer 220 reproduces the STC with reference to the clock reference transferred from the stream demultiplexer 221. A technique used for reproducing the STC using the clock reference is a technique specified by the respective standards such as MPEG.

The demultiplexer 220 further has an STC latch circuit 223. The STC latch circuit 223 receives the VSYNC from the video source 260. Then, the STC latch circuit 223 latches (holds) a value of the STC counter 222 at an input timing of the VSYNC. The STC latch circuit 223 supplies the latched STC values to the PTS controller 250, the video source 260, and the audio source 270.

When receiving encoded video data (video stream), the video decoder 230 decodes the video stream, and reproduces video data. The video decoder 230 supplies the reproduced video data to the video source 260. The video data per video stream to be supplied is attached with a video PTS indicating an output time of the video. The video decoder 230 has a PTS extracting unit 231. The PTS extracting unit 231 extracts a first video PTS (video first PTS) from a header of a video stream, and transfers the video first PTS to the PTS controller 250. The video decoder 230 may transfer, to the PTS controller 250, all of the video PTSs sequentially extracted from the video stream without the limitation to the video first PTS.

When receiving encoded audio data (audio stream), the audio decoder 240 decodes the audio stream, and reproduces audio data. The audio decoder 240 has a PTS extracting unit 241. The PTS extracting unit 241 extracts a first audio PTS (audio first PTS) from a header of an audio stream, and transfers the audio first PTS to the PTS controller 250. The audio decoder 240 may transfer, to the PTS controller 250, all of the audio PTSs sequentially extracted from the audio stream without the limitation to the audio first PTS. The audio decoder 240 receives, from the PTS controller 250, a difference value between each video first PTS of video data and the STC upon occurrence of the VSYNC.

The audio decoder 240 adds/subtracts the difference value supplied from the PTS controller 250 to/from the audio first PTS extracted from the header of the audio stream, thereby correcting an audio PTS of the audio data per audio frame. Then, the audio decoder 240 attaches the audio PTS corrected by the difference value to the audio data per audio frame, and supplies the resultant audio data to the audio source 270.

The PTS controller 250 receives the video first PTS and the audio first PTS from the video decoder 230 and the audio decoder 240, respectively, and controls an output timing of video and audio based on the obtained PTSs. Specifically, the PTS controller 250 receives an STC latched by the STC latch circuit 223. The PTS controller 250 calculates a difference value between a video first PTS of a first video frame of the video data and an STC upon occurrence of the VSYNC. Then, the PTS controller 250 transfers the calculated difference value to the audio decoder 240.

The PTS controller 250 compares the video first PTS from the video decoder 230 and the audio first PTS from the audio decoder 240, and determines the output start times of the video data and the audio data. Then, the PTS controller 250 supplies a PTS (video output start PTS) indicating a video output start time to the video source 260, and supplies a PTS (audio output start PTS) indicating an audio output start time to the audio source 270.

When receiving a PTS (video first PTS or audio first PTS) from any one of the video decoder 230 and the audio decoder 240, the PTS controller 250 starts time measurement using a timer. When failing to receive the other PTS within a predetermined time (when a time-out occurs), the PTS controller 250 determines that only any one of video data and audio data is streamed. When receiving a video first PTS from the video decoder 230 and then failing to receive an audio first PTS from the audio decoder 240 within a predetermined time, the PTS controller 250 supplies a video output start PTS only to the video source 260. Meanwhile, when receiving an audio first PTS from the audio decoder 240 and then failing to receive a video first PTS from the video decoder 230 within a predetermined time, the PTS controller 250 supplies an audio output start PTS only to the audio source 270.

The video source 260 displays incoming video data from the video decoder 230 on a monitor 13a of the TV set 13. A switching of screens per video frame is performed at a timing of the VSYNC. The VSYNC is sent out from a circuit within the video source 260 at a predetermined cycle. The VSYNC is supplied to the STC latch circuit 223 within the demultiplexer 220.

The video source 260 has a video buffer 261 for storing video data per video frame. The video source 260 temporarily stores the incoming video data from the video decoder 230 in the video buffer 261. When receiving the video output start PTS from the PTS controller 250, the video source 260 replaces, with invalid data, the video data with a PTS having a value smaller than that of the video output start PTS.

Further, the video source 260 receives an STC from the STC latch circuit 223. Then, the video source 260 displays, on the monitor 13a, video dada with a PTS after the video output start PTS at a timing when the attached PTS value and the STC value are synchronized. The video data replaced with invalid data and the displayed video data are deleted from the video buffer 261.

The audio source 270 outputs, from a speaker 13b of the TV set 13, the audio represented by the incoming audio data from the audio decoder 240. The audio source 270 has an audio buffer 271 for storing audio data per audio frame. The audio source 270 temporarily stores the incoming audio data from the audio decoder 240 in the audio buffer 271. When receiving the audio output start PTS from the PTS controller 250, the audio source 270 replaces, with invalid data, the audio data with a PTS having a value smaller than that of the audio output start PTS.

Further, the audio source 270 receives an STC from the STC latch circuit 223. Then, the audio source 270 converts audio dada with PTSs after the audio output start PTS into audio signals at a timing when the attached PTS value and the STC value are synchronized, and supplies the audio signals to the speaker 13b. The audio data replaced with invalid data and the output audio data are deleted from the audio buffer 271.

According to the above-described decoder 200, the network interface 210 receives a system stream from the encoder 100. Then, the network interface 210 transfers the incoming system stream to the demultiplexer 220. The demultiplexer 220 converts the incoming system stream into a PES stream, and then converts the PES stream into a video stream and an audio stream. Then, the demultiplexer 220 supplies the video stream to the video decoder 230, and supplies the audio stream to the audio decoder 240.

The demultiplexer 220 extracts the clock reference (PCR or SCR) from the system stream, and reproduces the STC. The reproduced STC is set in the STC counter 222. The STC latch circuit 223 latches a value of the STC counter 222 at an input timing of the VSYNC. The STC latch circuit 223 supplies the latched STC values to the PTS controller 250, the video source 260, and the audio source 270.

The video decoder 230 decodes a video stream, and reproduces video data. The reproduced video data is attached with a video PTS per video frame and supplied to the video source 260. The PTS extracting unit 231 of the video decoder 230 extracts a video first PTS from a packet header of a video stream, and transfers the extracted video first PTS to the PTS controller 250.

The PTS controller 250 calculates a difference value between a video first PTS and an STC upon occurrence of the VSYNC. Then, the PTS controller 250 transfers the calculated difference value to the audio decoder 240.

The audio decoder 240 decodes an audio stream, and reproduces audio data. The reproduced audio data is attached with an audio first PTS per audio frame. On this occasion, the audio decoder 240 adds/subtracts a difference value supplied from the PTS controller 250 to/from the audio first PTS of each audio frame. Then, the audio decoder 240 attaches the audio PTS corrected by the difference value to the audio data per audio frame, and supplies the resultant audio data to the audio source 270. The PTS extracting unit 241 of the audio decoder 240 extracts an audio first PTS from a packet header of an audio stream, and transfers the extracted audio first PTS to the PTS controller 250.

When receiving any one of the video first PTS and the audio first PTS, the PTS controller 250 starts time measurement using a counter. Then, when receiving the other PTS within a predetermined time, the PTS controller 250 controls synchronous output of video and audio. Meanwhile, when receiving any one of the video first PTS and the audio first PTS, and then failing to receive the other PTS within a predetermined time, the PTS controller 250 controls output of only any one of video and audio.

When controlling the synchronous output, the PTS controller 250 sets the video and audio output start times to a larger value of the video first PTS and the audio first PTS. At this time, when the value of the video first PTS is larger than that of the audio first PTS, the PTS controller 250 determines that the value of the video first PTS is a video output start PTS and an audio output start PTS. Conversely, when the value of the audio first PTS is larger than that of the video first PTS, the PTS controller 250 determines that the minimum value among the values of the video PTSs larger than that of the audio first PTS is a video output start PTS and an audio output start PTS. Then, the PTS controller 250 supplies the video output start PTS to the video source 260, and supplies the audio output start PTS to the audio source 270.

When sequentially receiving video PTSs from the video decoder 230, the PTS controller 250 determines the minimum value among the values of the video PTSs larger than that of the audio first PTS based on the sequentially supplied values of the video PTSs. When receiving only the video first PTS from the video decoder 230, the PTS controller 250 sequentially adds the increase in the PTS value per frame to the value of the video first PTS, thereby calculating values of the subsequent video PTSs. Then, the PTS controller 250 determines the minimum value among the values of the video PTSs larger than that of the audio first PTS based on the calculated values of the video PTSs.

The video source 260 stores the incoming video data from the video decoder 230 in the video buffer 261. The video source 260 starts the output to the monitor 13a by outputting the video data with a PTS after the video output start PTS supplied from the PTS controller 250. The video data with the PTS before the video output start PTS is deleted from the video buffer 261. When the video data is output, a range of the value of the PTS output at a timing of the next VSYNC is determined based on the STC supplied from the STC latch circuit 223. Then, the video source 260 supplies, to the monitor 13a in synchronization with the VSYNC, the video data with a PTS that falls under the output range of the PTS.

The audio source 270 stores the incoming audio data from the audio decoder 240 in the audio buffer 271. The audio source 270 converts, into invalid data (e.g., data that becomes silent), the audio data with a PTS before the audio output start PTS supplied from the PTS controller 250. Further, the audio source 270 converts, into audio signals, the audio data with a PTS that falls under the output range of the PTS based on a value of the incoming STC from the STC latch circuit 223, and supplies the audio signals to the speaker 13b.

Thus, the video output and the audio output can be extremely precisely synchronized with each other. That is, since the video needs to be displayed in synchronization with the VSYNC, an error occurs according to a difference between the time when the VSYNC occurs and the time when the PTS and the STC are synchronized. Accordingly, when a difference value between the video PTS and the STC upon occurrence of the VSYNC is added/subtracted to/from a PTS attached to the video data, also the audio data can be synchronized with the VSYNC. As a result, the video and the audio can be output in precise synchronization with each other.

In the example of FIG. 4, the STC latch circuit 223 is provided within the demultiplexer 220. The STC latch circuit 223 may also be provided within the PTS controller 250. When the STC latch circuit 223 is provided within the PTS controller 250, a value of the STC counter 222 needs to be supplied to the PTS controller 250, and the VSYNC needs to be supplied to the PTS controller 250 from the video source 260. Further, the STC is supplied from the STC latch circuit 223 within the PTS controller 250 to the video source 260 and the audio source 270.

The following will describe the range of the PTSs that can be displayed at an output timing of the VSYNC.

FIG. 5 illustrates an effective area of a display frame in the video output. FIG. 5 chronologically illustrates a PTS value of a video frame, a video display timing, an STC value upon occurrence of VSYNC, and a VSYNC output timing, beginning at the top.

In the display of the video frame in synchronization with the VSYNC used on the video side, the video frame that can be displayed based on the STC upon occurrence of one VSYNC is a video frame present in a time zone per frame time containing, based on a certain STC, a time of the STC (this is one example, and the range may be determined so as to prevent one frame time from being overlapped with each other).

For example, when an increase in the PTS value per video frame is 3003 as illustrated in the example of FIG. 5, a video frame that can be displayed at the STC 9003 is a video frame whose PTS values are 7502 to 10504.

The increase in the PTS value per video frame is determined by a frame rate. The frame rate is determined by a video broadcasting system. When the video frame rates are 59.94 Hz (NTSC) and 50 Hz (PAL: Phase Alternation by Line), the respective PTS values per video frame are as follows.

When the frame rate is 59.94 Hz (NTSC), the increase in the PTS value per video frame (in terms of 90 KHz) is 3003.

When the frame rate is 50 Hz (PAL), the increase in the PTS value (in terms of 90 KHz) per video frame is 3600.

Accordingly, the range of the PTSs that can be displayed at a certain STC value (T) is as follows.

When the frame rate is 59.94 Hz, T−1501≦PTS<T+1502

When the frame rate is 50 Hz, T−1800≦PTS<T+1800

In FIG. 5, for example, the video frame whose PTS values are from 7502 to 10504 can be displayed when the STC value is 9003. Also, the video frame whose PTS values are from 10505 to 13507 can be displayed when the STC value is 12006.

Next, procedures of processing performed by the PTS controller 250 will be described.

FIG. 6 is a flowchart illustrating the processing procedures of the PTS controller 250. The processing illustrated in FIG. 6 will be described below along the step numbers.

(Step S11) The PTS controller 250 determines whether a PTS is supplied from any one of the video decoder 230 and the audio decoder 240. If YES, the process goes to step S12. If NO, the process in step S11 is repeated.

(Step S12) The PTS controller 250 determines whether the incoming PTS is a video first PTS from the video decoder 230, or an audio first PTS from the audio decoder 240. When the video first PTS is supplied, the process goes to step S13. When the audio first PTS is supplied, the process goes to step S18.

(Step S13) When receiving the video first PTS, the PTS controller 250 starts time measurement using a timer.

(Step S14) The PTS controller 250 determines whether the audio first PTS is supplied from the audio decoder 240. If YES, the process goes to step S23. If NO, the process goes to step S15.

(Step S15) The PTS controller 250 determines whether a waiting time for the audio first PTS runs out. Specifically, the waiting time for the audio first PTS is previously set in a memory within the PTS controller 250. When a time measured by the timer exceeds the waiting time for the audio first PTS, the PTS controller 250 determines that a time-out occurs. If YES, the process goes to step S16. If NO, the process returns to step S14, and the PTS controller 250 waits for the audio first PTS to be supplied.

(Step S16) If YES in step S15, the PTS controller 250 receives an STC latched by the STC latch circuit 223.

(Step S17) The PTS controller 250 instructs the video source 260 to start the output of the video stream (ES) in synchronization with the STC. Specifically, the PTS controller 250 supplies, as a video output start PTS, the STC obtained in step S16 to the video source 260. Then, the video source 260 sequentially outputs the video data with a PTS after the video output start PTS in synchronization with the STC. Thereafter, the PTS controller 250 ends the processing.

(Step S18) When receiving the audio first PTS, the PTS controller 250 starts time measurement using a timer.

(Step S19) The PTS controller 250 determines whether the video first PTS is supplied from the video decoder 230. If YES, the process goes to step S23. If NO, the process goes to step S20.

(Step S20) The PTS controller 250 determines whether a waiting time for the video first PTS runs out. Specifically, the waiting time for the video first PTS is previously set in a memory within the PTS controller 250. When a time measured by the timer exceeds the waiting time for the video first PTS, the PTS controller 250 determines that a time-out occurs. If YES, the process goes to step S21. If NO, the process returns to step S19, and the PTS controller 250 waits for the video first PTS to be supplied.

(Step S21) If YES in step S20, the PTS controller 250 receives an STC latched by the STC latch circuit 223.

(Step S22) The PTS controller 250 instructs the audio source 270 to start output of the audio stream (AES) in synchronization with the STC. Specifically, the PTS controller 250 supplies, as an audio output start PTS, the STC obtained in step S21 to the audio source 270. Then, the audio source 270 sequentially outputs the audio data with a PTS after the audio output start PTS in synchronization with the STC. Thereafter, the PTS controller 250 ends the processing.

(Step S23) The PTS controller 250 receives an STC latched by the STC latch circuit 223.

(Step S24) The PTS controller 250 obtains a PTS indicating an output start time. Specifically, the PTS controller 250 compares a video first PTS supplied from the video decoder 230 and an STC obtained in step S23. Next, the PTS controller 250 determines a range of the PTSs that can be displayed based on the obtained STC (see FIG. 5). The increase in the PTS value per video frame is determined by a frame rate. Therefore, the PTS controller 250 can calculate, based on the video first PTS, values of the video PTSs of each video frame after the video first PTS. Based on the calculated video PTSs, the PTS controller 250 determines, in the PTSs of the video data per video frame supplied from the video decoder 230, PTSs that fall under the output range of the PTS that can be displayed based on the STC obtained in step S23. Then, the PTS controller 250 determines that the PTS that can be displayed is the video PTS (video output start PTS) indicating an output start time.

(Step S25) The PTS controller 250 calculates a difference value between the STC obtained in step S23 and the video output start PTS. For example, the PTS controller 250 subtracts a value of the PTS indicating the output start time from a value of the obtained STC. As illustrated in FIG. 5, values of the PTSs that can be displayed based on the STC may be larger or smaller than the corresponding STC. When the PTS value is larger than the STC value, the subtraction result (difference value) has a negative value. When the PTS value is smaller than the STC value, the subtraction result (difference value) has a positive value. The calculated difference value is transferred to the audio decoder 240. The audio decoder 240 adds the difference value to each PTS of an audio frame (substantially, performs addition/subtraction based on positive or negative of the difference value), thereby correcting a display error of the video frame.

(Step S26) The PTS controller 250 compares a video first PTS and an audio first PTS. When the video first PTS is larger than the audio first PTS, the process goes to step S27. When a value of the video first PTS is the same as that of the audio first PTS, the process goes to step S28. When a value of the audio first PTS is larger than that of the video first PTS, the process goes to step S29.

(Step S27) When the video first PTS is larger than the audio first PTS, the PTS controller 250 instructs the video source 260 and the audio source 270 to start the synchronous output of video and audio in synchronization with the video PTS. Specifically, the PTS controller 250 supplies a video output start PTS to the video source 260, and supplies an audio output start PTS having the same value as that of the video output start PTS to the audio source 270. Then, the audio source 270 replaces, with invalid data, the audio data of from the first audio frame of the audio stream (AES) to the audio frame with a PTS before the audio output start PTS. As a result, the video output and the audio output are synchronously started. Then, the PTS controller 250 ends the processing.

(Step S28) When the video first PTS and the audio first PTS have the same value, the PTS controller 250 instructs the video source 260 and the audio source 270 to start the synchronous output of video and audio in synchronization with the video PTS. Specifically, the PTS controller 250 supplies a video output start PTS to the video source 260, and supplies an audio output start PTS having the same value as that of the video output start PTS to the audio source 270. Then, the video source 260 and the audio source 270 start the synchronous output by outputting the first video frame and the first audio frame of the video stream and the audio stream, respectively. Then, the PTS controller 250 ends the processing.

(Step S29) When the audio first PTS is larger than the video first PTS, the PTS controller 250 instructs the video source 260 and the audio source 270 to start the synchronous output of video and audio in synchronization with the audio PTS. Specifically, the PTS controller 250 determines the minimum video PTS among the video PTSs larger than the audio first PTS. Then, the PTS controller 250 supplies the minimum video PTS to the video source 260 as the video output start PTS, and supplies the minimum video PTS to the audio source 270 as the audio output start PTS. Then, the video source 260 replaces, with invalid data, the video data of from the first video frame of the video stream (ES) to the video frame with a PTS before the video output start PTS. Then, the video source 260 outputs the video based on the video frame after the video output start PTS.

The audio source 270 starts the output of audio by outputting the audio frame (first audio frame of an audio stream) with the audio first PTS. Note, however, that the audio source 270 replaces, with invalid data, the audio data of from the first audio frame of the audio stream (AES) to the audio frame with a PTS before the audio output start PTS. Specifically, the time per video frame of video data is not synchronized with the time per audio frame of audio data. Accordingly, when sampling operations of video and audio are not synchronously started (the video first PTS is not synchronized with the audio first PTS), the audio first PTS is deviated from the video first PTS. Accordingly, the audio source 270 replaces, with invalid data (silent data), the audio data of from the audio first PTS to the audio output start PTS (the same as the first video PTS after the audio first PTS), thereby delaying start of audio output. As a result, the video output and the audio output are synchronously started. Then, the PTS controller 250 ends the processing.

When the audio first PTS is larger than the video first PTS, a video first-out control may be performed. In that case, the PTS controller 250 supplies, as the video output start PTS, a value of the video first PTS to the video source 260. Further, the PTS controller 250 supplies, as the audio output start PTS, a value of the audio first PTS to the audio source 270. As a result, the video output by the video source 260 is started earlier than the audio output by the audio source 270.

Next, an example will be described using a timing chart, in which the video output and the audio output are precisely synchronized with each other when the video first PTS and the audio first PTS are the same.

FIG. 7 is a timing chart illustrating encoding processing by the encoder 100. FIG. 7 illustrates time transition of video data, audio data, an STC, a video stream (ES), and an audio stream (AES), beginning at the top.

The illustrated time transition of the video data is transition of video data per video frame to be supplied to the video encoder 120. The illustrated time transition of the audio data is transition of audio data per audio frame to be supplied to the audio encoder 130. The illustrated time transition of the STC is transition of an STC value supplied from the STC latch circuit 142 to the video encoder 120 or the audio encoder 130.

The illustrated time transition of the video stream is transition of a video packet from the video encoder 120. A position of an output start time of a video packet is attached with a value of a video PTS attached to a packet header of the video packet.

The illustrated time transition of the audio stream is transition of an audio packet from the audio encoder 130. A position of an output start time of an audio packet is attached with a value of an audio PTS attached to a packet header of the audio packet.

In the example of FIG. 7, input operations of the video data and the audio data to the encoder 100 are synchronously started. A time per video frame of the video data is indicated by "T_Video". Video data (Video 1, Video 2, . . . ) per video frame are sequentially supplied to the video encoder 120 at a time period of the "T_Video".

A time per audio frame of the audio data is indicated by "T_Audio". Audio data (Audio 1, Audio 2, . . . ) per audio frame are sequentially supplied to the audio encoder 130 at a time period of the "T_Audio".

When encoded data is generated by the video encoder 120, a video stream is output. The video stream can be demultiplexed into video packets (Video AU1, Video AU2, . . . ) per video frame. In the example of FIG. 7, a value of the STC that synchronizes with the output start time of the video packets "Video AU1" of the first video frame is an "STC_Video 1". A value of the STC that synchronizes with the output start time of the video packets "Video AU2" of the second video frame is an "STC_Video 2".

A packet header of a first video packet of the video packets (Video AU1, Video AU2, . . . ) constituting each video frame is attached with a video PTS. A packet header of a first video packet of the video packets (Video AU1) constituting a first video frame is attached with a video PTS (PTS_V1) of the first video frame. A value of the PTS_V1 is a value obtained by adding a predetermined maximum value $\alpha$ of an encoding delay time to a value (STC_Video 1) of the STC that synchronizes with an output start time of the video packets "Video AU1". A packet header of a first video packet of the video packets (Video AU2) constituting a second video frame is attached with a video PTS (PTS_V2) of the second video frame. A value of the "PTS_V2" is a value obtained by adding a time "T_Video" per video frame to the last value "PTS_V1" of the video PTS of the video frame.

When encoded data is generated by the audio encoder 130, an audio stream is output. The audio stream can be demultiplexed into audio packets (Audio AU1, Audio AU2, . . . ) per audio frame. In the example of FIG. 7, a value of the STC that synchronizes with the output start time of the audio packets "Audio AU1" of the first audio frame is an "STC_Audio 1". A value of the STC that synchronizes with the output start time of the audio packets "Audio AU2" of the second audio frame is an "STC_Audio 2".

A packet header of a first audio packet of the audio packets (Audio AU1, Audio AU2, . . . ) constituting each audio frame is attached with an audio PTS. A packet header of a first audio packet of the audio packets (Audio AU1) constituting a first audio frame is attached with an audio PTS (PTS_A1) of the first audio frame. A value of the PTS_A1 is a value obtained by adding a predetermined maximum value β of an encoding delay time to a value (STC_Audio 1) of the STC that synchronizes with an output start time of the audio packets "Audio AU1". A packet header of a first audio packet of the audio packets (Audio AU2) constituting a second audio frame is attached with an audio PTS (PTS_A2) of the second audio frame. A value of the "PTS_A2" is a value obtained by adding a time "T_Audio" per audio frame to the last value "PTS_A1" of audio PTS of the audio frame.

Next, a procedure of decoding processing will be described.

FIG. 8 is a timing chart illustrating the decoding processing by the decoder 200. FIG. 8 illustrates time transition of video stream, an audio stream, an STC, a VSYNC (vertical synchronizing signal), video data, and audio data, beginning at the top.

The illustrated time transition of the video stream is transition of a video packet of a video stream supplied to the video decoder 230. The video packet is indicated by a set (video packets) per video frame. Further, the video PTS attached to a first video packet of the video packets is indicated in parenthesis.

The illustrated time transition of the audio stream is transition of an audio packet of an audio stream supplied to the audio decoder 240. The audio packet is indicated by a set (audio packets) per audio frame. Further, the audio PTS attached to a first audio packet of the audio packets is indicated in parenthesis.

The illustrated time transition of the STC is transition of an STC value supplied from the STC latch circuit 223 to the video decoder 230 or the audio decoder 240. The illustrated time transition of the VSYNC is transition of an output time of the VSYNC generated by the video source 260, which is indicated by an arrow. The illustrated time transition of the video data is transition of video data per video frame supplied to the video source 260. The illustrated time transition of the audio data is transition of audio data per audio frame supplied to the audio source 270.

In the example of FIG. 8, the video stream is supplied earlier than the audio stream. In the video stream, a video packet (Video AU1) with a video first PTS (PTS_V1) is first supplied. Then, the subsequent video packet (Video AU2) is supplied. The video first PTS (PTS_V1) is previously added with a maximum value α of an encoding delay time. Therefore, video of a video frame represented by a video packet is displayed after a time corresponding to the number of counts "α" of the video PTS passes from the input of the video packet.

In the audio stream, an audio packet (Audio AU1) with an audio first PTS (PTS_A1) is first supplied. Then, the subsequent audio packet (Audio AU2) is supplied. The audio first PTS (PTS_A1) is previously added with a maximum value β of an encoding delay time. Therefore, audio of an audio frame represented by an audio packet is output after a time corresponding to the number of counts "β" of the audio PTS passes from the input of the audio packet. When values of "α" and "β" are adjusted, the video first PTS (PTS_V1) and the audio first PTS (PTS_A1) have the same value if video capture and audio capture are synchronously started.

In this case, a value of the video first PTS (PTS_V1) is determined as the video output start PTS and the audio output start PTS. Then, the image output is started in synchronization with a timing of the VSYNC corresponding to the STC capable of displaying the video first PTS (PTS_V1). Further, audio data is output as follows. A difference value (ΔT) between the video first PTS and the STC latched at a timing of the VSYNC is added/subtracted to/from a value of the audio PTS of each audio frame. In the example of FIG. 8, a difference value (ΔT) is added. For example, when the STC value latched at an output timing of video data is "9003" and the video PTS value indicating the output start time is "8000", the difference value is 9003−8000=1003. This difference value "1003" is added to the audio PTS of the audio data, thereby outputting the audio data in synchronization with the STC.

Thus, the audio output is started in synchronization with a timing of the VSYNC corresponding to the STC capable of display the video first PTS (PTS_V1). As a result, the output start time of the video data and that of the audio data can be precisely synchronized with each other.

Next, a case will be described in which audio capture is started earlier than video capture.

FIG. 9 is a timing chart illustrating an output timing in a case where audio capture is started earlier than video capture. In this example, when a video first PTS and an audio first PTS are compared, the video first PTS is larger than the audio first PTS.

Here, suppose that a video first PTS of a video frame is 8000, an STC latched at the output timing of the VSYNC when the video first. PTS is 8000 is 9003, and an audio PTS of a first audio frame is 7000 (a video frame rate is 59.94 Hz, an increase in the video PTS value per video frame is 3003 in terms of 90 KHz, and video and audio PTSs attached to video and audio streams are represented by the unit of 90 KHz). In FIG. 9, invalid data of audio frames 21, 22, 23, 24, . . . is indicated by hatching.

As to an audio frame, for example, when an encoding mode is MPEG-1 Layer II and a sampling frequency is 48 KHz, the number of samples per audio frame is determined for each encoding mode in view of the standards, and the number of samples in the MPEG-1 Layer II is 1152. A difference value between the video PTS indicating an output start time of a video frame and the STC latched at an output timing of the VSYNC is 9003−8000=1003.

To synchronize the output start timing of the audio frame with that of the video frame, audio data with audio first PTSs of 7000 to 8000 in the audio frame 21 is replaced with invalid data 21a. Audio data with audio first PTSs after the audio first PTS 8000 in the audio frame 21 is valid data 21b.

A value of the audio PTS of each audio frame is added with the difference value "1003" between the video output start PTS and the STC latched at an output timing of the VSYNC.

Audio data corresponding to the data with 1000 audio first PTSs (unit is 90 KHz) calculated by subtracting the audio first PTS "7000" from the audio first PTS "8000" can be replaced with the invalid data 21a by calculating, as follows, the number of samples of audio data to be replaced with invalid data (invalid data means data having no influence on the output of audio, such as NULL data).

The audio first PTS is subtracted from the video first PTS and the subtraction result is multiplied by the "audio sampling frequency/the increase in the PTS per second", thereby calculating the number of samples of audio data to be replaced with invalid data. In the example of FIG. 9, the following value is obtained. The number of samples of audio data to be replaced with invalid data=(8000−7000)×48000/90000=533

Thus, when audio capture is started earlier than video capture, audio output is started after the STC capable of displaying a video output start PTS of video data. As a result, the video output and the audio output are accurately and synchronously started. Moreover, an audio PTS is corrected by a difference value between the output start PTS of a video frame and the STC latched at an output timing of the VSYNC. As a result, the synchronous output of video and audio is performed.

Next, an output example will be described when only a video stream or only an audio stream is supplied.

The PTS controller 250 can determine, using a timer, whether only a video stream or only an audio stream is supplied to the decoder 200. The timer can perform an internal count-up operation, and a count-up period and a threshold necessary for the determination can be arbitrarily set.

After receiving any one of PTSs of the video stream and the audio stream, the PTS controller 250 starts time measurement using the timer. When a time measured by the timer exceeds a threshold necessary for the determination (when time-out occurs), the PTS controller 250 obtains a value of the STC. Then, the PTS controller 250 instructs the source of the previously incoming stream to start the only output of the stream in synchronization with the STC.

FIG. 10 illustrates an output example when only a video stream is supplied. When a video stream is supplied and an audio stream fails to be supplied even after the passage of a predetermined time, only video data is output. The video data is output in synchronization with the VSYNC.

FIG. 11 illustrates an output example when only an audio stream is supplied. When an audio stream is supplied and a video stream fails to be supplied even after the passage of a predetermined time, only audio data is output. Irrespective of the VSYNC, audio data is output when the STC reaches a value indicated by an audio PTS.

In a state where only the video stream is supplied and the video frame output is started, when an audio stream is supplied after the passage of a predetermined time (within a threshold necessary for the determination), the following method is adopted. A difference value between an output start PTS of a video frame and an STC latched at the timing of the VSYNC is added to a PTS of an audio frame. This method enables the synchronous output of the video and the audio in the middle of the video output.

An opposite input case will be described. For example, in a state where only the audio stream is supplied and the audio frame output is started, when a video stream is supplied after the passage of a predetermined time (within a threshold necessary for the determination), the following methods are adopted. The audio stream and the video stream are output at each output timing in synchronization with the STC. Alternatively, the audio output once returns to the starting point and the synchronous output of video and audio is performed. Any method can easily be coped with according to an operation mode of a transmission system.

Next, an internal structure of the PTS controller 250 that realizes the above-described processing will be described.

FIG. 12 is a block diagram illustrating an internal structure of the PTS controller 250. The PTS controller 250 has a timer 251, a PTS determining unit 252, a synchronizing method determining unit 253, and a PTS difference information extracting unit 254.

The timer 251 starts time measurement according to an instruction from the PTS determining unit 252. A time measured by the timer 251 can be referred to from the PTS determining unit 252.

The PTS determining unit 252 receives a video first PTS and an audio first PTS. The PTS determining unit 252 starts, when receiving any one of the video first PTS and the audio first PTS, the time measurement using the timer 251. Further, the PTS determining unit 252 notifies the synchronizing method determining unit 253 of the incoming PTS. Then, the PTS determining unit 252 monitors the timer 251. When failing to receive the other PTS even if waiting for a period of time exceeding a predetermined threshold from the start of the time measurement by the timer 251, the PTS determining unit 252 notifies the synchronizing method determining unit 253 of time out information. When receiving the other PTS before the passage of a predetermined time from the start of the time measurement, the PTS determining unit 252 notifies the synchronizing method determining unit 253 of the late received PTS.

The synchronizing method determining unit 253 obtains the present STC via the STC latch circuit 223. When receiving the time out information, the synchronizing method determining unit 253 determines a video output start PTS or an audio output start PTS based on the obtained STC value and the notified PTS. When receiving any one of the first video PTS and the first audio PTS from the PTS determining unit 252 and receiving the other PTS before the time out occurs, the synchronizing method determining unit 253 determines the audio output start PTS and the video output start PTS based on the present STC, the audio first PTS, and the video first PTS. When determining the audio output start PTS and the video output start PTS, the synchronizing method determining unit 253 supplies the video output start PTS to the video source 260 and supplies the audio output start PTS to the audio source 270.

The synchronizing method determining unit 253 notifies the PTS difference information extracting unit 254 of the video output start PTS and the STC (STC supplied when a video frame with the video output start PTS is output in synchronization with the VSYNC) supplied when a video frame is output.

The PTS difference information extracting unit 254 calculates a difference value between a video output start PTS and an STC capable of displaying a video frame with the video output start PTS, and notifies the audio decoder 240 of the difference value. Then, the audio decoder 240 adds the notified value to a PTS of an audio frame, and supplies the resultant audio frame to the audio source 270.

Thus, the PTS control can be realized.

The PTS controller 250 can also be realized by a microcomputer. An example of a PTS controller realized by a microcomputer will be described below.

FIG. 13 illustrates an example of a PTS controller realized by a microcomputer. A PTS controller 250a has a CPU 256, a ROM 257, a RAM 258, and an input-output interface 259.

The CPU 256 controls the entire PTS controller 250a. The CPU 256 executes the processing illustrated in FIG. 6 according to a program previously stored in the ROM 257. The CPU 256 temporarily stores intermediate data for the processing in the RAM 258. The CPU 256 receives an input value necessary for the processing via the input-output interface 259, and outputs an output value as the processing result via the input-output interface 259.

The ROM 257 stores a program for causing the CPU 256 to execute the processing illustrated in FIG. 6. The ROM 257 previously stores also a time threshold measured by the timer.

The RAM 258 is used as a work memory for arithmetic processing of the CPU 256. For example, when the CPU 256 executes the time measurement by a timer function, a value indicating a time is arbitrarily stored in the RAM 258. A value indicating a time is updated by the CPU 256 as needed.

The input-output interface 259 is a circuit for performing data input/output to/from an outer circuit. The input-output interface 259 receives a video first PTS from the video decoder 230 and receives an audio first PTS from the audio decoder 240. Further, the PTS controller 250 receives an STC from the STC latch circuit 223. The input-output interface 259 supplies a difference value to the audio decoder 240. Further, the input-output interface 259 supplies a video output start PTS to the video source 260 and supplies an audio output start PTS to the audio source 270.

A program describing a processing content of the functions to be owned by the PTS controller 250a can be recorded on a computer-readable recording medium. Examples of the computer-readable recording medium include a magnetic recording system, an optical disk, a magneto-optical recording medium, and a semiconductor memory. Examples of the magnetic recording system include a Hard Disk Drive (HDD), a Flexible Disk (FD), and a magnetic tape. Examples of the optical disk include DVD (Digital Versatile Disc), DVD-RAM, CD-ROM (Compact Disc Read Only Memory), and CD-R (Recordable)/RW (ReWritable). Examples of the magneto-optical recording medium include MO (Magneto-Optical disk).

In the case of distributing a program, portable recording media such as DVDs and CD-ROMs having recorded thereon the program are sold. Further, the program may be stored in a storage device of a server computer so as to be transferred from the server computer to another computer via a network.

A decoder that executes a program stores in its own storage device, for example, a program recorded on a portable recording medium or a program transferred from a server computer. Then, the decoder reads out the program from its own storage device and executes processing according to the program. Alternatively, the decoder may directly read out a program from a portable recording medium and execute the processing according to the program. Further alternatively, the decoder may sequentially execute processing according to a received program every time a program is transferred from a server computer.

To summarize the above descriptions, the proposed decoder according to the embodiment corrects audio output time information by a difference value between a occurrence time of a synchronizing signal and video output time information. Therefore, the decoder can precisely synchronize video output and audio output.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A decoder for outputting video and audio based on stream data, comprising:

a time information generator which generates reference time information whose value increases with time;

a video decoder which decodes, when receiving a video stream, the incoming video stream to generate video data, the video stream being obtained by encoding video data and being attached with video output time information indicating an output time of video per video frame, and which extracts the video output time information attached to each video frame;

an audio decoder which decodes, when receiving an audio stream, the incoming audio stream to generate audio data, the audio stream being obtained by encoding audio data and being attached with audio output time information indicating an output time of audio per audio frame, and which extracts the audio output time information attached to each audio frame;

a difference value calculator which calculates a difference value between an occurrence time of a synchronizing signal indicating an output timing of video and the video output time information;

an audio output time corrector which corrects, using the difference value calculated by the difference value calculator, the audio output time information attached to each audio frame;

an output start time determining unit which compares values of a first video output time information extracted from a first video frame and a first audio output time information extracted from a first audio frame, and which determines, when the value of the first video output time information is larger than that of the first audio output time information, that a time indicated by the first video output time information is an audio output start time;

a video source which outputs video upon each occurrence of the synchronizing signal based on a previously defined relationship between a value of the reference time information upon occurrence of the synchronizing signal and a range of the video output time information that can be displayed upon the occurrence of the synchronizing signal, the video being represented by a video frame attached with the video output time information that can be displayed based on a value of the reference time information upon the occurrence of the synchronizing signal; and an audio source which replaces generated audio with invalid data before a time indicated by the reference time information reaches the audio output start time, and which outputs audio when a value of the reference time information and a corrected value of the audio output time information are synchronized, the audio being represented by an audio frame with the synchronized audio output time information.

2. The decoder according to claim 1, wherein:

the output start time determining unit determines, when the value of the first audio output time information is larger than that of the first video output time information, that a time with a minimum value among the values of the video output time information larger than that of the first audio output time information is a video output start time; and the video source replaces, with invalid data, video generated from a video frame with video output time information having a value smaller than that of the video output start time.

3. The decoder according to claim 2, wherein:

the output start time determining unit determines, when a value of the first audio output time information is larger than that of the first video output time information, that the same time as the video output start time is an audio output start time; and the audio source replaces generated audio with invalid data before a time indicated by the reference time information reaches the audio output start time.

4. The decoder according to claim 1, further comprising:

a time-out determining unit which measures an elapsed time from the time when any one of the first video output time information and the first audio output time information is extracted; determines, when the elapsed time exceeds a predetermined threshold before the other information is extracted, that a time-out occurs; and determines, when the time-out occurs, that only video data is output when only the first video output time information is extracted and that only audio data is output when only the first audio output time information is extracted;

wherein, when the time-out determining unit determines that only video data is output, the video source starts the generation of video data from a video frame and the output of the generated video data.

5. The decoder according to claim 1, wherein:

based on a previously defined relationship between a value of the reference time information upon occurrence of the synchronizing signal and a range of the video output time information that can be displayed upon the occurrence of the synchronizing signal, the difference value calculator determines reference time information capable of displaying the video output time information, and calculates a difference value between the video output time information and the reference time information.

6. A decoding method for causing a decoder to output video and audio based on stream data, comprising:

causing a time information generator to generate reference time information whose value increases with time;

causing a video decoder to decode, when receiving a video stream, the incoming video stream to generate video data, the video stream being obtained by encoding video data and being attached with video output time information indicating an output time of video per video frame, and causing a video decoder to extract the video output time information attached to each video frame;

causing an audio decoder to decode, when receiving an audio stream, the incoming audio stream to generate audio data, the audio stream being obtained by encoding audio data and being attached with audio output time information indicating an output time of audio per audio frame, and to extract the audio output time information attached to each audio frame;

causing a difference value calculator to calculate a difference value between an occurrence time of a synchronizing signal indicating an output timing of video and the video output time information;

causing an audio output time corrector to correct, using the difference value calculated by the difference value calculator, the audio output time information attached to each audio frame;

causing an output start time determining unit to compare values of a first video output time information extracted from a first video frame and a first audio output time information extracted from a first audio frame, and determine, when the value of the first video output time information is larger than that of the first audio output time information, that a time indicated by the first video output time information is an audio output start time;

causing a video source to output video upon each occurrence of the synchronizing signal based on a previously defined relationship between a value of the reference time information upon occurrence of the synchronizing signal and a range of the video output time information that can be displayed upon the occurrence of the synchronizing signal, the video being represented by a video frame attached with the video output time information that can be displayed based on a value of the reference time information upon the occurrence of the synchronizing signal; and causing an audio source to replace generated audio with invalid data before a time indicated by the reference time information reaches the audio output start time, and output audio when a value of the reference time information and a corrected value of the audio output time information are synchronized, the audio being represented by an audio frame with the synchronized audio output time information.

* * * * *